(12) United States Patent
Muraki et al.

(10) Patent No.: US 7,802,311 B2
(45) Date of Patent: Sep. 21, 2010

(54) RECORDING APPARATUS, RECORDING METHOD, RECORDING MEDIUM AND PROGRAM

(75) Inventors: Kenji Muraki, Osaka (JP); Tetsuhiko Kaneaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 1263 days.

(21) Appl. No.: 10/541,997

(22) PCT Filed: Jan. 14, 2004

(86) PCT No.: PCT/JP2004/000189

§ 371 (c)(1),
(2), (4) Date: Feb. 7, 2006

(87) PCT Pub. No.: WO2004/064062

PCT Pub. Date: Jul. 29, 2004

(65) Prior Publication Data

US 2006/0146604 A1    Jul. 6, 2006

(30) Foreign Application Priority Data

Jan. 14, 2003    (JP) .............................. 2003-006068

(51) Int. Cl.
*G06F 21/24* (2006.01)
(52) U.S. Cl. .............................. 726/31; 726/30; 726/32; 713/176
(58) Field of Classification Search .................. 713/176
See application file for complete search history.

(56) References Cited

U.S. PATENT DOCUMENTS

| 5,896,454 | A | 4/1999 | Cookson et al. | |
|---|---|---|---|---|
| 6,442,285 | B2* | 8/2002 | Rhoads et al. | 382/100 |
| 7,050,604 | B2* | 5/2006 | Fujihara et al. | 382/100 |
| 7,224,819 | B2* | 5/2007 | Levy et al. | 382/100 |
| 7,280,661 | B2* | 10/2007 | Sako et al. | 380/201 |
| 7,310,819 | B2* | 12/2007 | Maes et al. | 726/26 |
| 7,340,152 | B1* | 3/2008 | Talstra et al. | 386/94 |
| 7,454,621 | B2* | 11/2008 | Maes et al. | 713/176 |

FOREIGN PATENT DOCUMENTS

| JP | 11-075169 A | 3/1999 |
|---|---|---|
| JP | 2000-501875 A | 2/2000 |
| JP | 2001-229612 A | 8/2001 |
| WO | WO 01/93264 A1 | 12/2001 |

(Continued)

OTHER PUBLICATIONS

"4C 12 Bit Watermark Specification", Oct. 1999, 4C Entity, Retrieved from the Internet on Dec. 21, 2009: <URL: http://www.4centity.com/docs/4C_Spec.pdf>.*

(Continued)

*Primary Examiner*—Minh Dinh
(74) *Attorney, Agent, or Firm*—RatnerPrestia

(57) ABSTRACT

A recording apparatus which executes copy control utilizing copy control information which is indicative of plural types of copy control includes an electronic watermark detection device, which detects a predetermined copy control information portion of the copy control information out of a content over which an electronic watermark expressing the copy control information is superimposed, and a recording device which records a content in accordance with a detection result obtained by the electronic watermark detection device.

10 Claims, 13 Drawing Sheets

FOREIGN PATENT DOCUMENTS

WO    WO 02/11140 A1    2/2002

OTHER PUBLICATIONS

Winograd, "Audio Watermarking Technologies for Protection of Digital Audio and Video", Sep. 2000, Verance Corporation, Retrieved from the Internet on Dec. 21, 2009: <URL: http://www.cptwg.org/Assets/Presentations/September%20presentations/DVD_CPTWGv1_0%5B1%5D.ppt>.*

"Amendment 3 to SDMI Portable Device Specification, Part I, Version 1.0", published at http://www.sdmi.org/download/port_device_spec_amend3.pdf, Document No. SDMI-01051710a, Amsterdam, dated May 17, 2001.

International Search Report for PCT/JP2004/000189, dated Apr. 13, 2004.

* cited by examiner

Fig. 6

| DETECTION MODE | "NO MORE_COPY" ONLY | | | | ALL | | | |
|---|---|---|---|---|---|---|---|---|
| EMBEDDED ELECTRONIC WATERMARK | NONE | COPY_FREELY | COPY_ONE_GENERATION | NO_MORE_COPY | NONE | COPY_FREELY | COPY_ONE_GENERATION | NO_MORE_COPY |
| FIRST DETECTION RESULT | NO DETECTION | NO DETECTION | NO DETECTION | NO_MORE_COPY | NO DETECTION | COPY_FREELY | COPY_ONE_GENERATION | NO_MORE_COPY |
| SECOND DETECTION RESULT | NO DETECTION | NO DETECTION | NO DETECTION | NO EXECUTION | NO DETECTION | NO EXECUTION | NO EXECUTION | NO EXECUTION |
| WHETHER TO PERMIT COPYING | YES | YES | YES | NO | YES | YES | YES | NO |

Fig. 7    PRIOR ART

| COPY CONTROL CONDITION | DIGITAL CCI STATUS | | PLAYER PLAYBACK CONTROL | WATERMARK CCI STATUS | | PLAYER PLAYBACK CONTROL |
| --- | --- | --- | --- | --- | --- | --- |
| | C4 | C3 | | C4 | C3 | |
| COPY FREE | 0 | 0 | RESTRICTED PLAYBACK | 0 | 0 | NORMAL PLAYBACK |
| RESTRICTED COPYING | 1 | 0 | NORMAL PLAYBACK | 1 | 0 | RESTRICTED PLAYBACK |
| COPY PROHIBITED | 1 | 1 | NORMAL PLAYBACK | 1 | 1 | RESTRICTED PLAYBACK |

RECORDING APPARATUS, RECORDING METHOD, RECORDING MEDIUM AND PROGRAM

THIS APPLICATION IS A U.S. NATIONAL PHASE APPLICATION OF PCT INTERNATIONAL APPLICATION PCT/JP2004/000189.

FIELD OF THE INVENTION

The present invention relates to a recording apparatus, a playback apparatus, a multi-function apparatus, a recording method, a playback method, a recording/playback method, a program and a recording medium which perform control of recording or playback of content in accordance with an electronic watermark embedded in the content.

BACKGROUND ART

Advancement of digitization of audio visual equipment over the recent years has made it possible to copy content without quality deterioration. However, unlimited copying of copyrighted content could infringe the right to which the copyright holder is entitled. Therefore, there is a demand to have a proper copyright protection function for audio visual equipment.

As copy control in digital audio equipment, a serial copy management system (hereinafter abbreviated as "SCMS") has been widely used from around the 1980s. In the SCMS, copy control information is recorded together with content in a medium such as a CD, a minidisk (MD) and an airwave. When the content is to be copied with a connection established inside the same housing or between different pieces of equipment via a digital interface, whether to permit copying is controlled in accordance with the copy control information of the content. The SCMS is effective to a certain extent, as in the case of commercial recording machines, such as those for MDs.

The SCMS however requires that the copy control information is held as digital data which is independent from the content. This allows neither transmission of the copy control information during analog transmission, nor copy control. Further, when a personal computer or the like is used, the copy control information can be easily nullified.

In light of these problems with the SCMS, the Content Protection for Prerecorded Media standard and the Content Protection for Recordable Media standard (hereinafter abbreviated as "CPPM" and "CPRM") which are copyright protection systems utilizing the DVD and the SD (Secure Digital) Memory Card Audio standards (hereinafter abbreviated as "SD Audio") adopt a copy control method which uses an electronic watermark. Meanwhile, copy control/playback control methods which use electronic watermarking have been proposed for the SDMI (Secure Digital Music Initiative) standard determined involving the music industry, the computer industry, the consumer electronics industry and the like.

Even when a signal in which an electronic watermark is embedded is played back, one cannot recognize a difference between this signal and the original signal while viewing normally. Thus, the quality of the content does not deteriorate. Since an electronic watermark is embedded directly in the content, copy control information can be transmitted even during analog transmission. An electronic watermark also has durability so that copy control information is maintained even after ordinary audio compression and expansion (e.g., MP3). In addition, without special embedding and a special decryption apparatus, an electronic watermark can not be read or written. When combined with encryption of content itself, an electronic watermark can realize more powerful copy control than the SCMS.

By means of electronic watermarking technologies for use in CPPM, CPRM and SDMI, it is possible to embed 12-bit information as an electronic watermark within digital audio data of the linear PCM format. Of this, two bits are used for copy control. The two bits express the three states: "copy_freely"; "copy_one_generation" and "no_more_copy". Although these two bits, as such, can express four states, use of the remaining one is prohibited.

An electronic watermark is detected through predetermined signal processing of digital audio data of the linear PCM format for a predetermined period of time (which is fifteen seconds in the case of SDMI, CPRM and CPPM). In the event that content has been compressed as MP3 or the like, an electronic watermark is detected after decoding into linear PCM. Even an analog signal, when converted into linear PCM using an AD convertor, permits detection of an electronic watermark.

As for the detection of an electronic watermark, there are two results. First, is that an electronic watermark is detected. Second, is that an electronic watermark is not detected. Upon detection of an electronic watermark, the three states of "copy_freely", "copy_one_generation" and "no_more_copy" are distinguished from each other.

In relation to playback control utilizing conventional electronic watermarking, Japanese Patent Application Laid-Open Gazette No. 2001-229612 titled "COPY CONTROL METHOD FOR DIGITAL DATA AND OPTICAL DISK PLAYBACK APPARATUS" for example describes an optical disk playback apparatus (pages 7 through 13, and FIGS. 6 and 12). This optical disk playback apparatus will now be described as a first conventional technique. This optical disk playback apparatus is an apparatus complying with the CPPM control method.

The entire disclosure of Japanese Patent Application Laid-Open Gazette No. 2001-229612 is incorporated herein by reference in its entirety.

While describing playback control in the following, copy control information embedded in a content using electronic watermarking will be referred to as watermark CCI. In contrast, copy control information recorded as digital data in an optical disk, independent of content, will be referred to as digital CCI. Digital CCI and watermark CCI in an optical disk demand playback control as shown in FIG. 7.

In FIG. 7, digital CCI is added to an encrypted content, and in accordance with the value of the digital CCI, a player performs playback control as described below. Encrypted recording of a copy-free content, namely, a content bearing digital CCI of 00 is prohibited. Hence, a content which has been encrypted but bears digital CCI of 00 is regarded as an unauthorized content, and playback is restricted. Meanwhile, when the digital CCI is 10, that is, in the case of restricted copying (copy_one_generation), the player plays back in a normal manner. The player plays back in the normal manner also when the digital CCI is 11, that is, in the case of prohibited copying.

On the contrary, when content has not been encrypted, in accordance with the value of watermark CCI, the player performs playback control as follows. First, when the watermark CCI is 00, that is, in the case of free copying, the player plays back in the normal manner. Meanwhile, when the watermark CCI is 10, that is, in the case of restricted copying (copy_one_generation), the player restricts playback. The player restricts playback also when the watermark CCI is 11, that is, in the case of prohibited copying.

FIG. 8 is a block diagram of an optical disk player which uses a conventional copy control method. The optical disk player 174 is comprised of a spindle motor 161, an optical pickup 162, a mechanism control part 163, a signal processing part 164, an encryption/decryption apparatus 165, a digital CCI decryption apparatus 166, an audio visual decryption apparatus 167, a watermark CCI decryption apparatus 169, a DA convertor 168, a digital signal output control part 170, an analog signal output control part 171, a display part 172 and a system control part 173.

The spindle motor 161 rotates a disk 160. The optical pickup 162 reads a signal recorded on the disk 160. The mechanism control part 163 drives and controls the spindle motor 161 and the optical pickup 162. The signal processing part 164 retrieves data out of an output from the optical pickup 162 or executes error correction to thereby extract a system stream and supplies a control signal to the mechanism control part 163. The signal processing part 164 also analyzes the system stream, extracts playback style information which is indicative of the start and the end of a playback unit, the end of playback of a whole disk, etc., and sends to the system control part 173. The encryption/decryption apparatus 165 checks whether the system stream has been encrypted and in the event that the system stream has been encrypted, decrypts the cipher. The encryption/decryption apparatus 165 also provides the system control part 173 with encryption status information which expresses whether the system stream has been encrypted. The digital CCI decryption apparatus 166 detects digital CCI out of an unencrypted system stream output from the encryption/decryption apparatus 165. The audio visual decryption apparatus 167 extracts a digital audio signal or digital video signal out of an unencrypted system stream output from the encryption/decryption apparatus 165 and performs decoding. The watermark CCI decryption apparatus 169 detects watermark CCI data out of the digital audio signal or digital video signal output from the audio visual decryption apparatus 167. The DA convertor 168 converts the digital audio signal or digital video signal into an analog audio signal or analog video signal. The digital signal output control part 170 converts the digital audio signal or analog audio signal into a preset output format (for instance, IEC60958, IEEE1394) and executes output control. The analog signal output control part 171 executes output control for the analog audio signal or analog video signal output by the DA convertor 168. The display part 172 displays an operating state. The system control part 173 reads the watermark CCI data and the digital CCI data, playback status information available from the signal processing part 164 and the encryption status information of the system stream available from the encryption/decryption apparatus 165, controls the digital signal output control part 170 and the analog signal output control part 171 and also controls the display part 172 and the mechanism control part 163 as well.

A digital playback operation of the optical disk player 174 having such a structure will now be described. The digital playback operation described below is an operation for a situation that DVD audio is recorded on the disk 160 and the DVD audio recorded on the disk 160 is played back.

The optical pickup 162 reads a signal recorded on the disk 160. While supplying the control signal to the mechanism control part 163, the signal processing part 164 retrieves data, corrects errors and extracts a system stream. The encryption/decryption apparatus 165 checks whether the system stream has been encrypted, and in the event that the system stream has been encrypted, decrypts the cipher and transfers the unencrypted system stream to the digital CCI decryption apparatus 166 and the audio visual decryption apparatus 167.

The audio visual decryption apparatus 167 extracts a digital audio signal or digital video signal out of the system stream, and decodes and transfers the signal to the watermark CCI decryption apparatus 169 and the digital signal output control part 170. As for the DVD audio, since video data such as a still picture can be attached to the DVD audio, the audio visual decryption apparatus 167 and the like process the digital audio signal or digital video signal.

The digital signal output control part 170 converts the digital audio signal or digital video signal into the preset output format (for instance, IEC60958, IEEE1394) and outputs the signal.

The digital CCI decryption apparatus 166 decodes digital CCI data out of the system stream and transfers the same to the system control part 173. The watermark CCI decryption apparatus 169 detects watermark CCI data out of the digital audio signal and transfers the same to the system control part 173.

The system control part 173 reads the digital CCI data and the watermark CCI data, and controls the digital signal output control part 170 and the mechanism control part 163 in accordance with these data. Further, the system control part 173 transfers operation display information to the display part 172.

With reference to FIG. 9, a description will now be given on an example of a copy control flow executed by the system control part 173 during playback of the conventional optical disk having the structure above.

First, the system control part 173 checks whether the system stream available from the encryption/decryption apparatus 165 has been encrypted (Step 1). In the event that the system stream has been encrypted, the system control part 173 checks whether there is digital CCI data (Step 2). When there is digital CCI data, the system control part 173 examines whether the digital CCI data is not "copy_freely" (Step 3). As shown in FIG. 7, the digital CCI of encrypted audio or video digital data indicates only "copy_one_generation" or "no_more_copy", but not "copy_freely". Hence, when the digital CCI data denotes "copy_freely", the disk is determined an illegally copied disk. As a result, the system control part 173 controls both the digital signal output control part 170 and the analog signal output control part 171 and mutes both the digital signal output and the analog signal output (Step 4).

On the contrary, when it is determined at Step 3 that the digital CCI data does not denote "copy_freely", the system control part 173 performs normal playback (Step 8).

Meanwhile, when it is determined at Step 1 that the system stream has not been encrypted and when it is determined at Step 2 that there is not digital CCI data, the system control part 173 reads whether there is watermark CCI available from the watermark CCI decryption apparatus 169 (Step 9). Next, with the presence of watermark CCI data, the system control part 173 inspects whether the watermark CCI data denotes "copy_freely" (Step 10). As shown in FIG. 7, normal playback is permitted only when the watermark CCI data denotes "copy_freely" (Step 12), whereas the disk is determined an illegal copy in the case of "copy_one_generation" and "no_more_copy". In consequence, the system control part 173 controls both the digital signal output control part 170 and the analog signal output control part 171 and mutes both the digital signal output and the analog signal output (Step 11).

The system control part 173 recognizes the end of a playback unit (e.g., a whole piece of music) (Step 5) and returns back to Step 1 if the end has not come. When it is the end of a playback unit however, the system control part 173 determines whether the end of the whole disk has come (Step 6). When it is not the end of the whole disk, the system control part 173 sets the digital signal output control part 170 and the analog signal output control part 171 once again to normal output states and returns to Step 1. On the contrary, when it is the end of the whole disk, the system control part 173 ends the playback.

As described above, the first conventional technique secures copyright protection during playback of an optical disk.

Recording control utilizing electronic watermarking of the SDMI method according to "Amendment 3 to SDMI Portable Device Specification, Part I, Version 1.0" revised on Jun. 5, 2001 and issued by SECURE DIGITAL MUSIC INITIATIVE will now be described as a second conventional technique. Audio records and SD audio on Memory stick (registered trademark) comply with this SDMI control method.

The disclosure of "Amendment 3 to SDMI Portable Device Specification, Part I, Version 1.0" revised on Jun. 5, 2001 and issued by SECURE DIGITAL MUSIC INITIATIVE is incorporated herein by reference in its entirety.

Recording of SD audio is generally classified into two types. First, recording of an SDMI-protected content and second, recording of an SDMI-unprotected content. SDMI-protected contents, including the copy control information, are under protection by encryption according to the SDMI standard. Hence, SD audio recording of an SDMI-protected content must be in accordance with encrypted copy control information. On the other hand, in the case of an SDMI-unprotected content, which is content other than an SDMI-protected content, despite the existence of the copy control information attached to the content, the copy control information included in an electronic watermark embedded in the content needs be examined noting the possibility of tampering.

As for SD audio, a content to be recorded is compressed and encrypted into an SDMI-protected content. Further, in relation to the equipment identifier of SD audio equipment, a media identifier, etc., there is a restriction over the number of copies that can be made as SDMI-protected contents. In addition, a digital output is basically prohibited from SD audio equipment so that a digital copy (second-generation copy) will not be made on an ordinary digital medium (which may be an MD, a CD-R, etc.) which is not under the restriction described above. In other words, an SDMI-protected content is copy-prohibited other than on SD audio equipment. Hence, for recording of SD audio, only whether the copy control information of an input content denoting "no_more_copy" needs to be determined. Whether marking is "copy_one_generation" or "copy_freely" needs not be distinguished from each other.

Such an SDMI control method will now be described in further detail.

The SDMI control method is a control method of recording and playback of audio on a Memory stick, an SD memory card, etc.

FIG. 10 shows the outline of the SDMI control method. SD audio equipment employing the SDMI control method divides input signals into four types, i.e., a distributed input, a protected input, an unprotected input and an unencrypted content input, and performs different input processing on each of these.

First, a distributed input is inputting of content distributed via the Internet or the like. However, processing of content received as distributed input is processing outside the SDMI control method. A content received as a distributed input is distributed after it is encrypted usually by means of a different encryption scheme for each provider. For instance, using this encryption scheme, it is possible to set, for example, that up to three copies of the content can be made. Further, accounting or the like is also possible. Hence, in order to execute input processing of the content upon receipt of the content as a distributed input, using an encryption package corresponding to the provider, input processing of the content is carried out and purchase processing of the content is also executed. Thus distributed content is then recorded on an HDD, an SD card or the like with a priority given to an encrypted usage rule sent from the provider with the content, and applied to the content, i.e., in accordance with a rule set by an encryption scheme designed for each provider.

A protected input is inputting of a content transmitted by the IEEE1394-DTCP (Digital Transmission Content Protection) method.

IEEE1394 permits synchronous transmission of data in a high-speed bus system which is for serial transmission, and hence, realizes real-time transmission of audio visual data. As such, IEEE1394 is employed as an external interface in a wide spectrum of digital audio visual equipment including consumer digital audio visual equipment. The IEEE1394-DTCP method requires the authentication function and the key invalidation function in relation to data transmission over an IEEE1394 bus. As data which needs copyright protection such as audio visual data encrypted and transmitted, copyright protection is ensured. When content needs to be copyright-protected, at the time of transmission of the content, the content is encrypted and transmitted according to the IEEE1394-DTCP method, thereby protecting the copyright of the content.

Since content received as a protected input is transmitted by the IEEE1394-DTCP method, it is difficult to tamper the information regarding the copyright protection for the content. In short, since the information regarding the copyright protection for the content is reliable, when the content is input, control is implemented using digital CCI (digital copy control information).

That is, when the content is received as a protected input, the digital CCI of the content is detected, and whether to record on a medium is determined based on the detected digital CCI.

To be more specific, when the digital CCI of the content received as a protected input denotes "no_more_copy", SD audio equipment complying with the SDMI control method does not record the content on a medium. On the contrary, when the digital CCI of the input content denotes "copy_freely" or "copy_one_generation", this SD audio equipment encrypts the content and records the same on a medium, and as expressed in FIG. 10 as UPDATE DCCI (digital CCI), updates the digital CCI of the content to "no_more_copy" and performs CPRM encryption/recording. CPPM encryption/recording is encrypted recording based on an encryption rule defined in CPPM.

The reason why the SD audio equipment complying with the SDMI control method updates the digital CCI of the input content to "no_more_copy" and then records even when the digital CCI denotes "copy_freely" is because SD audio equipment complying with the SDMI control method is prohibited from outputting a digital output. Therefore, SD audio equipment does not comprise a digital output terminal.

Thus recorded content is processed as an SDMI-protected content.

An unprotected input is inputting of a content recorded on a CD or the like by SDMI control-compliant SD audio equipment in accordance with IEC958, which is a standard for transmitting such content over an optical cable, or inputting of such content as an analog signal. In the case of an unprotected input, because digital CCI could have been tampered, watermark CCI is detected and whether to permit recording is determined. In short, upon receipt of content as an unprotected input, SD audio equipment complying with the SDMI control method first detects watermark CCI, as expressed in FIG. 10 as DETECT WM (watermark). When the detected watermark CCI denotes "no_more_copy", recording of the content received as an unprotected input does not take place. Meanwhile, when the detected watermark CCI denotes "copy_freely" or "copy_one_generation", the content is CPRM encrypted and recorded on a medium, and the digital CCI of the recorded content is set to "no_more_copy". The content recorded on the medium in this manner is handled as an SDMI-protected content when the content is to be played back from the medium. In this fashion, content received as a protected input or unprotected input is recorded on an HDD, an SD card or the like in accordance with a default usage rule. This rule applies a predetermined rule to an unprotected input such as a CD, a distributed content not bearing a usage rule and the like, that is, in accordance with a predetermined rule which may specify for instance that the number of check-outs is three or smaller.

An SDMI-protected content described above referring to a content which is transmitted in encrypted or otherwise protected form, is determined whether it can be recorded or not based on its digital CCI, and is encrypted by CPRM and recorded. Or the content which is determined whether it can be recorded or not based on its watermark CCI, at any stage of transmission, is passed screening using the watermark CCI, and is encrypted by CPRM and recorded.

An unencrypted content input is inputting of a content in unencrypted form as in the case of plaintext MP3 (MPEG Audio Layer III), and such a content is recorded in an unsecured area of a medium. However, an unencrypted content is outside the SDMI control method. A PC (personal computer) for instance can accept inputting of an unencrypted content. In short, a PC can receive content such as plaintext MP3 and record the same in an unsecured area of an SD memory card. Because permitting copying based on watermark CCI is not determined as for a content recorded in this manner, the content is called an SDMI-unprotected content. When an SDMI-unprotected content is to be output from SD audio equipment, watermark CCI is detected and playback is controlled in accordance with the SDMI control method. This will be described later.

Output processing in accordance with the SDMI control method will now be described.

Output processing in accordance with the SDMI control method includes processing of outputting to an SD memory card and analog output processing. During output processing in accordance with the SDMI control method, digital output processing is usually prohibited.

Processing of outputting to an SD memory card is managed by means of check-in/out. Check-in/out is processing of managing how many times one SDMI-protected content is checked out (recorded) onto, for example, an SD memory card, during recording of SDMI-protected contents recorded on a hard disk of a PC. When up to three check-outs of an SDMI-protected content onto SD memory cards is permitted for instance, after checking out the SDMI-protected content onto three SD memory cards, it is not possible to check out the SDMI-protected content onto other SD memory cards any more. However, when an SD memory card, onto which the SDMI-protected content has been checked out, is inserted in a PC and this SDMI-protected content is checked in onto the PC from the SD memory card inserted to the PC, it is possible to check out this SDMI-protected content onto yet another SD memory card. Upon check-in from the SD memory card to the PC, this SDMI-protected content gets deleted from the SD memory card. In this manner, the number of SD memory cards which will receive the SDMI-protected content is managed by means of check-outs.

Analog output processing is processing of outputting analog to ear phones, a speaker, etc. A content output through analog output processing is output usually at a speed of X1.5 or slower.

SD audio equipment complying with the SDMI control method can output an SDMI-protected content as analog independent of the values of the digital CCI, the watermark CCI, etc. In other words, because an SDMI-protected content was recorded in accordance with the copy control information, such as the digital CCI and the watermark CCI during recording, it is not necessary to perform playback control utilizing the copy control information again during playback. On the other hand, an unencrypted content recorded in an unsecured area of an SD memory card, namely, an SDMI-unprotected content is not recorded referring to watermark CCI, digital CCI or the like during recording. Hence, for playback, the watermark CCI is detected and playback control is performed based on the detected watermark CCI. Playback control is executed based on the watermark CCI because of possible tampering of the digital CCI.

Further, SD audio equipment complying with the SDMI control method does not comprise a digital output terminal so that a digital output will not be output as described above during playback of an SDMI-protected content, an SDMI-unprotected content, etc. For instance, SD audio equipment complying with the SDMI control method is not capable of outputting a digital output in accordance with IEC958.

Described below, as an example, is the recording control method for SD audio according to "Amendment 3 to SDMI Portable Device Specification, Part I, Version 1.0" revised on Jun. 5, 2001 and issued by SECURE DIGITAL MUSIC INITIATIVE. In short, an example of how content, received as unprotected input, is recorded as SD audio will be described. The description below corresponds to an operation in FIG. 10 of recording an SDMI-unprotected content received as an unprotected input onto an SD memory card, as expressed in FIG. 10 as UNPROTECTED INPUT.

FIG. 11 is a drawing which shows the timing of detecting an electronic watermark according to the second conventional technique. For detection of an electronic watermark, an audio signal lasting for fifteen seconds must be processed. This will be hereinafter referred to as an electronic watermark detection window.

FIG. 12 is a block diagram of a recording apparatus which utilizes electronic watermarking according to the second conventional technique. The recording apparatus is comprised of a content input terminal 801, an electronic watermark detection means 802 and a recording means 803. The electronic watermark detection means 802 is a means which detects an electronic watermark out of content. The recording means 803 is a means which records content.

The recording means 803 compresses content and records the same in encrypted form. When a control signal denoting "no_more_copy" is sent from the electronic watermark detection means 802, the content is deleted, including those portions which have been recorded so far.

FIG. 13 is a flow chart which shows the procedure in which the electronic watermark detection means 802 shown in FIG. 12 sends the control signal based on an electronic watermark of content. This will now be described with reference to FIG. 13.

First, upon receipt of a content start command, for the purpose of detecting an electronic watermark as a first trial within fifteen seconds from the start, the electronic watermark detection means 802 starts a first electronic watermark detection window, and within thirty seconds from the start, the first electronic watermark detection is completed (Step 1). The first electronic watermark detection may be started at the same time as the start of the content or any appropriate point within fifteen seconds from the start of the content. During recording of SD audio, the input content is compressed, encrypted and recorded. Although not shown in FIG. 12, the recording means 803 shown in FIG. 12 executes the compression/encryption processing at the same time as the electronic watermark detecting processing.

After the end of the first electronic watermark detection window, the electronic watermark detection means 802 confirms whether an electronic watermark has been found, that is, whether an electronic watermark detection flag is "1" (Step 2).

When it is found at (Step 2) that the electronic watermark detection flag is "1", the electronic watermark detection means 802 confirms whether it is found the electronic watermark denotes "no_more_copy", that is, whether the electronic watermark is "11" (Step 3).

When it is found at (Step 3) that the electronic watermark is not "11", this content may be copied. Hence, at this stage, the electronic watermark detection means 802 terminates the detection of the electronic watermark and sends the control signal indicative of permission of copying to the recording means 803 (Step 8). The recording means 803 continues compression and encryption of the content.

On the contrary, when it is found at (Step 3) that the electronic watermark denotes "no_more_copy", because copying of this content is prohibited, the electronic watermark detection means 802 sends the control signal, indicative of prohibition of copying to the recording means 803 (Step 9). The recording means 803 stops compression and encryption and deletes contents which have already been compressed and encrypted. Further, in the event that the recording apparatus records SD audio in the same housing as a CD player for instance, the recording apparatus may go to a next content during playback from a CD, stop playback or otherwise control. When receiving content from outside, the recording apparatus can not stop inputting of the content, and therefore, the recording apparatus may directly enter a standby state.

In contrast, when an electronic watermark is not found at (Step 2), the recording apparatus waits at any desired point at or after forty-five seconds (Step 4). The recording apparatus then performs a second electronic watermark detection, which is a detection of an electronic watermark as a second trial (Step 5).

The second electronic watermark detection is executed, because the first electronic watermark detection is performed near the top of an audio signal. Because playback of a tune has just started near the top of the audio signal, the audio signal is often at a low level. When the audio signal is often at a low level, detection of an electronic watermark is difficult. That is, when the level of the audio signal is low, the first electronic watermark detection often fails. As the second electronic watermark detection is performed after a while because of the first electronic watermark detection, it is likely that the level of the audio signal has risen before the second electronic watermark detection, despite the failure of the first electronic watermark detection. In this case, it is possible to more securely detect an electronic watermark. In other words, when an electronic watermark is detected during the first electronic watermark detection, the detection value is regarded valid. When no electronic watermark is detected during the first electronic watermark detection, it is possible that no electronic watermark was actually embedded or that electronic watermark detection has failed. Noting this, to reduce the risk of failure of the electronic watermark detection, the second electronic watermark detection is executed after a certain period of time.

As the second electronic watermark detection window ends, the electronic watermark detection means 802 confirms whether an electronic watermark has been found, that is, whether the electronic watermark detection flag is "1" (Step 6).

When it is found at (Step 6) that the electronic watermark detection flag is "1", the electronic watermark detection means 802 confirms whether the electronic watermark thus found denotes "no_more_copy", that is, whether the electronic watermark is "11" (Step 7).

When it is found at (Step 7) that the electronic watermark is not "11", this content may be copied. Hence, the electronic watermark detection means 802 sends the control signal indicative of permission of copying to the recording means 803 (Step 8).

On the contrary, when it is found at (Step 7) that the electronic watermark denotes "no_more_copy", because copying of this content is prohibited, the electronic watermark detection means 802 sends the control signal indicative of prohibition of copying to the recording means 803 (Step 9).

In contrast, when no electronic watermark is found at (Step 6), the recording apparatus decides that this content does not carry any electronic watermark and can therefore be copied. The electronic watermark detection means 802 therefore sends the control signal indicative of permission of copying to the recording means 803 (Step 8). The recording means 803 continues compression and encryption of the content to the end.

As described above, SD audio is under copyright protection by means of the recording control method according to "Amendment 3 to SDMI Portable Device Specification, Part I, Version 1.0" revised on Jun. 5, 2001 and issued by SECURE DIGITAL MUSIC INITIATIVE.

However, in the conventional structure described above, similar electronic watermark detection is involved in both the optical disk playback control described in relation to the first conventional technique and the SD audio recording control described in relation to the second conventional technique. In short, the optical disk playback control described in relation to the first conventional technique demands detection of all states of an electronic watermark. In contrast, it is not necessary to detect all states of an electronic watermark during the SD audio recording control described in relation to the second conventional technique. All states of an electronic watermark are nevertheless detected in the SD audio recording control of the second conventional technique. Thus, there is a problem that the efficiency is poor owing to excessive processing depending upon the specification of control.

That is, during the conventional SD audio recording control, copying of an SDMI-protected content is prohibited other than on SD audio equipment. Hence, although the copy control information of an input content denoting "no_more_copy" alone may be determined in the case of recording SD audio, all types of copy control of "no_more_copy", "copy_one_generation" and "copy_freely" are detected from the copy control information of the input content. The SD audio recording control includes the excessive processing and is poorly efficient. Further, such a problem can occur during other recording control than that for SD audio. For example, a similar problem occurs during audio recording in accordance with the CPPM control method, the CPRM control method, etc.

Playback control of SD audio is similar. In other words, control is exercised such that as for playback of an SDMI-unprotected content, the content will not be played back when the copy control information denotes "no_more_copy". However, the content will be played back when the copy control information denotes "copy_one_generation" or "copy_freely". That is, whether it may alone be determined the copy control information of the input content denotes "no_more_copy", control may be exercised such that playback will be stopped when the copy control information denotes "no_more_copy" but will be performed when the copy control information does not denote "no_more_copy". Regardless of this, all types of copy control of "no_more_copy", "copy_one_generation" and "copy_freely" are detected from the copy control information.

In other words, since all types of copy control expressed by the copy control information are detected during the conventional recording control or playback control, there is a problem that the efficiency is poor due to the excessive processing.

SUMMARY OF DISCLOSURE

In light of the above, the present invention aims at providing a recording apparatus, a playback apparatus, a multi-function apparatus, a recording method, a playback method, a recording/playback method, a program and a recording medium with which it is possible to efficiently detect an electronic watermark.

A first aspect of the invention is a recording apparatus which executes copy control utilizing copy control information which is formed by plural bits of digital data and indicative of plural types of copy control, comprising: an electronic watermark detection means which detects predetermined certain bits of digital data in said copy control information out of a content over which an electronic watermark expressing said copy control information is superimposed; and a recording means which records said content in accordance with a detection result obtained by said electronic watermark detection means.

Further, a second aspect of the invention is the recording apparatus of the first aspect of the invention which is an SD apparatus complying with the SDMI control method, wherein said copy control information is available in three types of "copy_freely", "copy_one_generation" and "no_more_copy", and said predetermined certain bits of digital data expressing "no_more_copy".

Further, a third aspect of the invention is the recording apparatus of the first aspect of the invention which is a recording apparatus complying with the CPPM control method or the CPRM control method, wherein said copy control information is available in three types of "copy_freely", "copy_one_generation" and "no_more_copy" and said predetermined certain bits of digital data expressing "no_more_copy".

Further, a fourth aspect of the invention is the recording apparatus of the second aspect of the invention, wherein when the detection result obtained by said electronic watermark detection means indicates detection of said "no_more_copy", said recording means does not record said content, and when the detection result obtained by said electronic watermark detection means indicates that said "no_more_copy" is not detected, said recording means records said content.

Further, a fifth aspect of the invention is the recording apparatus of the third aspect of the invention, wherein when the detection result obtained by said electronic watermark detection means indicates detection of said "no_more_copy", said recording means does not record said content, and when the detection result obtained by said electronic watermark detection means indicates that said "no_more_copy" is not detected, said recording means records said content.

Further, a sixth aspect of the invention is the recording apparatus of the second aspect of the invention, wherein said recording means encrypts and records said content.

Further, a seventh aspect of the invention is the recording apparatus of the first aspect of the invention, wherein said content is an audio content.

Further, an eighth aspect of the invention is directed to a playback apparatus which executes playback control utilizing copy control information which is indicative of plural types of copy control, comprising:

an electronic watermark detection means which do not detect said copy control information out of an SDMI-protected content recorded by an SD apparatus complying with an SDMI control method when said content is to be played back, but when an SDMI-unprotected content, which is a content other than said SDMI-protected content, is to be played back, detects a predetermined copy control information portion of said copy control information out of said content over which an electronic watermark expressing said copy control information is superimposed; and a playback means which plays back said content when playback of said SDMI-protected content is desired, and play back said content in accordance with a detection result obtained by said electronic watermark detection means when playback of said SDMI-unprotected content is desired.

Further, a ninth aspect of the invention is directed to the playback apparatus of the eighth aspect of the invention wherein said copy control information is available in three types of "copy_freely", "copy_one_generation" and "no_more_copy", and said predetermined copy control information portion is "no_more_copy".

Further, a tenth aspect of the invention is directed to the playback apparatus of the ninth aspect of the invention wherein when playback of said SDMI-unprotected content is desired, said playback means does not play back said content if the detection result obtained by said electronic watermark detection means indicates detection of said "no_more_copy", but said playback means plays back said content if the detection result obtained by said electronic watermark detection means indicates that said "no_more_copy" is not detected.

Further, an eleventh aspect of the invention is directed to the playback apparatus of the eighth aspect of the invention wherein said content is an audio content.

Further, a twelfth aspect of the invention is directed to a multi-function apparatus which executes copy control utilizing copy control information which is indicative of plural types of copy control, comprising:

electronic watermark detection means which detects copy control information out of a content over which an electronic watermark expressing said copy control information is superimposed;

recording means which records said content in accordance with a detection result obtained by said electronic watermark detection means;

playback means which plays back said content in accordance with a detection result obtained by said electronic watermark detection means, wherein for recording of said content, said electronic watermark detection means detects a predetermined copy control information portion of said copy control information out of a content over which an electronic watermark expressing said copy control information is superimposed, and for playback of said content, said electronic watermark detection means detects all of said copy control information out of a content over which an electronic watermark expressing said copy control information is superimposed.

Further, a thirteenth aspect of the invention is a recording means which executes copy control utilizing copy control information which is formed by plural bits of digital data and indicative of plural types of copy control, comprising:

an electronic watermark detection step which detects predetermined certain bits of digital data in said copy control information out of a content over which an electronic watermark expressing said copy control information is superimposed; and a recording step which records said content in accordance with a detection result obtained by said electronic watermark detection means.

Further, a fourteenth aspect of the invention is directed to a playback method of executing playback control utilizing copy control information which is indicative of plural types of copy control, comprising:

an electronic watermark detecting step at which when an SDMI-protected content recorded by an SD apparatus complying with the SDMI control method is to be played back, detection of said copy control information out of said content is not performed, and when an SDMI-unprotected content, which is a content other than said SDMI-protected content, is to be played back, a predetermined copy control information portion of said copy control information is detected out of said content over which an electronic watermark expressing said copy control information is superimposed; and a playing back step at which said content is played back when playback of said SDMI-protected content is desired, and when playback of said SDMI-unprotected content is desired, said content is played back in accordance with a detection result obtained by said electronic watermark detection means.

Further, a fifteenth aspect of the invention is directed to a recording/playback method for use in a multi-function apparatus which executes copy control utilizing copy control information which is indicative of plural types of copy control, comprising:

an electronic watermark detecting step detecting copy control information out of a content over which an electronic watermark expressing said copy control information is superimposed;

a recording step recording said content in accordance with a detection result obtained by said electronic watermark detection means; and a playing back step playing back said content in accordance with a detection result obtained by said electronic watermark detection means, wherein when recording of said content is desired, at said electronic watermark detecting step, a predetermined copy control information portion of said copy control information is detected out of a content over which an electronic watermark expressing said copy control information is superimposed, and when playing back of said content is desired, at said electronic watermark detection step, all of said copy control information is detected out of a content over which an electronic watermark expressing said copy control information is superimposed.

Further, a sixteenth aspect of the present invention is a recording medium which can be processed on a computer and which holds a program of the recording apparatus of the first aspect of the invention, said recording medium makes a computer function as:

a part of an electronic watermark detection means which detects predetermined certain bits of digital data in said copy control information out of a content over which an electronic watermark expressing said copy control information is superimposed; and a part of a recording means which records said content in accordance with a detection result obtained by said electronic watermark detection means.

Further, a seventeenth aspect of the invention is directed to a recording medium which can be processed on a computer and which holds a program of the playback apparatus of the eighth aspect of the invention, said recording medium makes a computer function as:

an electronic watermark detection means which does not detect said copy control information out of an SDMI-protected content recorded by an SD apparatus complying with the SDMI control method when such a content is to be played back, but when an SDMI-unprotected content, which is a content other than said SDMI-protected content, is to be played back, detects a predetermined copy control information portion of said copy control information out of said content over which an electronic watermark expressing said copy control information is superimposed; and a part of a playback means which plays back said content when playback of said SDMI-protected content is desired, and plays back said content in accordance with a detection result obtained by said electronic watermark detection means when playback of said SDMI-unprotected content is desired.

Further, an eighteenth aspect of the invention is directed to a recording medium which can be processed on a computer and which holds a program of the multi-function apparatus of the twelfth aspect of the invention, said recording medium makes a computer function as:

an electronic watermark detection means which detects copy control information out of a content over which an electronic watermark expressing said copy control information is superimposed;

a part of a recording means which records said content in accordance with a detection result obtained by said electronic watermark detection means; and a part of a playback means which plays back said content in accordance with a detection result obtained by said electronic watermark detection means.

BRIEF DESCRIPTION OF THE DRAWINGS

FIG. 6 is a drawing which shows detection which is executed while changing between a mode of detecting an electronic watermark which is in a pre-designated state and a mode of detecting electronic watermarks in all states according to the exemplary embodiment of the present invention;

FIG. 7 is a drawing which shows the relationship between copy control management information and player playback control;

EXPLANATION OF THE REFERENCE SYMBOLS

Figure 1:
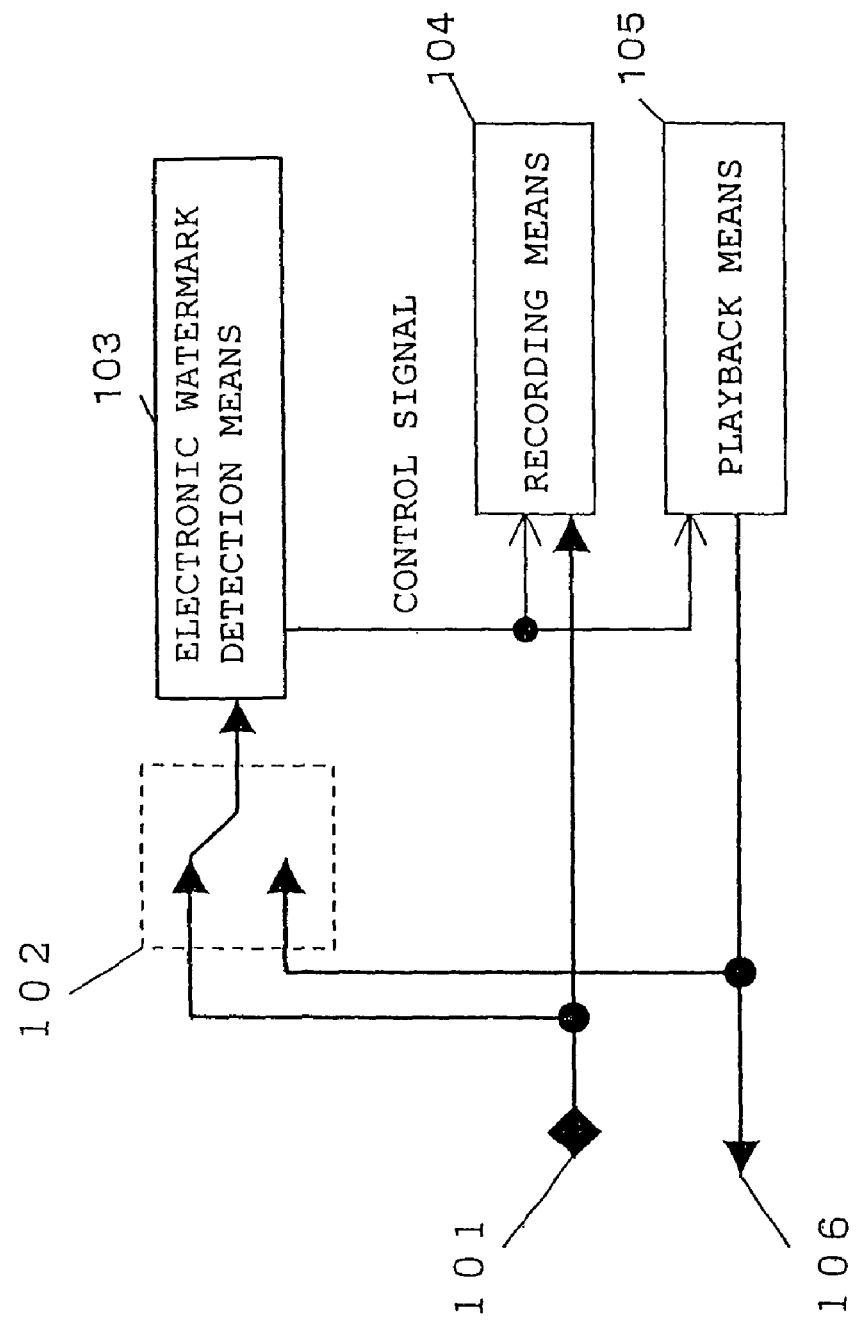
FIG. 1 is a block diagram which shows the structure of a recording/playback apparatus according to an exemplary embodiment of the present invention.

101 record content input terminal
102 content switching means
103 electronic watermark detection means
104 recording means
105 playback means
106 playback content output terminal

BEST MODE FOR IMPLEMENTING THE INVENTION

Embodiments of the present invention will now be described with reference to the associated drawings.

FIG. 1 is a block diagram which shows the structure of a recording/playback apparatus according to an exemplary embodiment of the present invention.

In FIG. 1, the recording/playback apparatus according to the embodiment is comprised of a record content input terminal 101, a content switching means 102, an electronic watermark detection means 103, a recording means 104, a playback means 105 and a playback content output terminal 106.

The record content input terminal 101 is a means at which a content to be recorded is received. The content switching means 102 is a means which selects content from the record content input terminal 101 or content from the playback means 105 and sends the same to the electronic watermark detection means 103. The electronic watermark detection means 103 is a means which detects an electronic watermark out of an input from the content switching means 102 and sends a control signal to the recording means 104 and the playback means 105. The recording means 104 is a means which compresses and encrypts a content to be recorded and records the same on an SD memory card (not shown). The playback means 105 is a means which decrypts and expands a content recorded on an SD memory card (not shown). The playback content output terminal 106 is a means which outputs content played back by the playback means 105.

First, a recording operation will be described. The recording operation described below corresponds to an operation in FIG. 10 of recording a content received as an unprotected input onto an SD memory card. During recording, the content switching means 102 is controlled so as to choose content from the record content input terminal 101.

The recording/playback apparatus according to the embodiment is basically prohibited from outputting a digital output as described earlier in relation to the conventional techniques, so that digital copies will not be made from the recording/playback apparatus according to the exemplary embodiment (SD audio equipment) onto ordinary digital media (such as MDs and CD-Rs). In short, an SDMI-protected content is treated as "no_more_copy", other than on SD audio equipment. Hence, for recording of SD audio, the recording/playback apparatus according to the exemplary embodiment determines only whether the copy control information of an input content denotes "no_more_copy" but does not distinguish "copy_one_generation" and "copy_freely" from each other. An SDMI-protected content has been described earlier in relation to the conventional techniques, and therefore, will not be described in detail.

Figure 2:
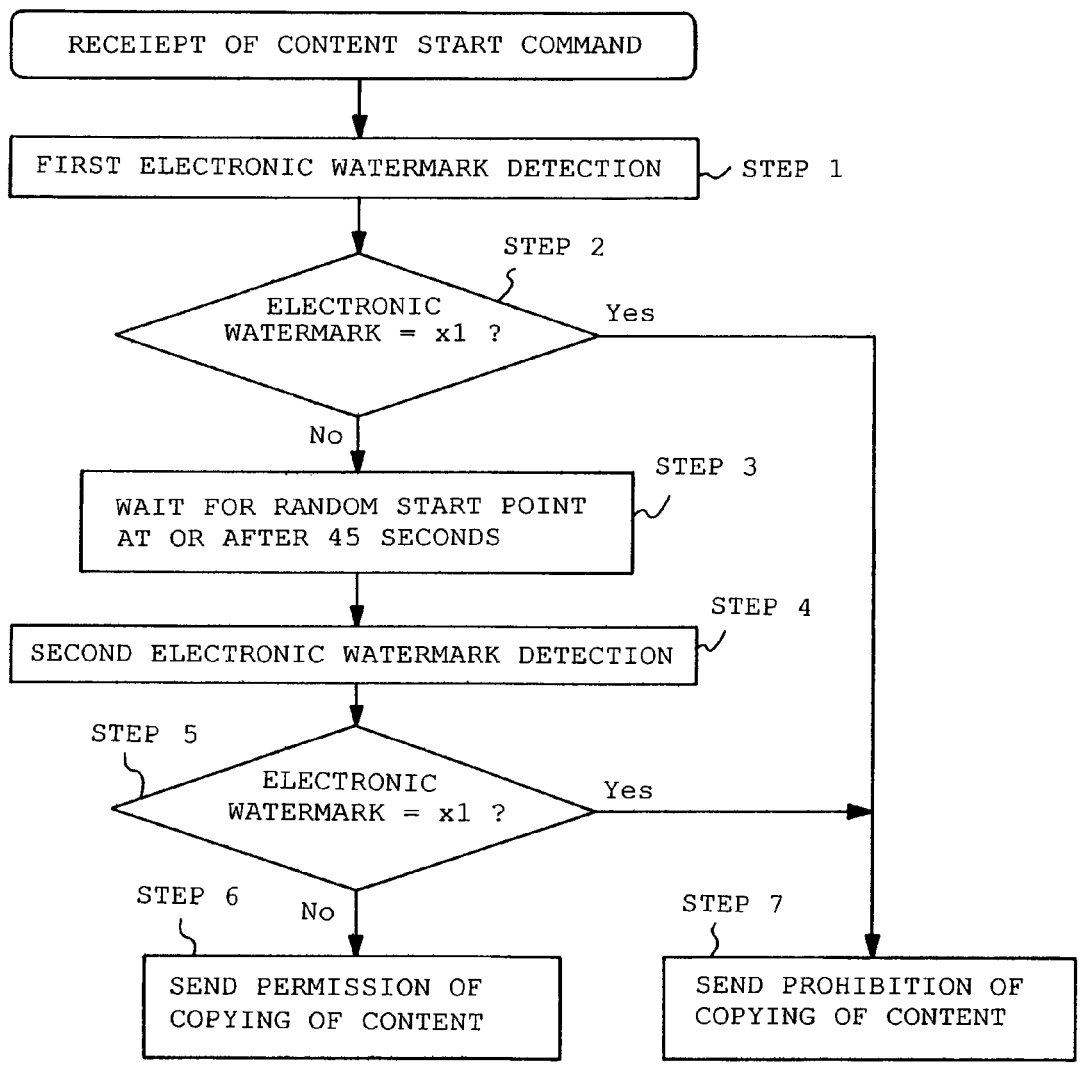
FIG. 2 is a flow chart which shows the procedure in which the recording/playback apparatus according to the exemplary embodiment of the present invention sends a control signal based on an electronic watermark of a content.

FIG. 2 is a flow chart which shows the procedure in which the electronic watermark detection means 103 shown in FIG. 1 sends the control signal based on an electronic watermark of content. This will now be described with reference to FIG. 2.

First, upon receipt of a content start command, for the purpose of detecting an electronic watermark as a first trial within fifteen seconds from the start, the electronic watermark detection means 103 starts a first electronic watermark detection window, and within thirty seconds from the start, the first electronic watermark detection completes (Step 1). The first electronic watermark detection may be started at the same time as the start of the content or any appropriate point within fifteen seconds from the start of the content. Concurrently with the processing of electronic watermark detection, the recording means 104 performs processing of compressing and encrypting SD audio.

After the end of the first electronic watermark detection window, the electronic watermark detection means 103 confirms whether an electronic watermark denotes "no_more_copy" (Step 2). Of the copy control information, "no_more_copy" is expressed by the 2-bit numerical value of "11", "copy_one_generation" is expressed by the 2-bit numerical value of "10" and "copy_freely" is expressed by the 2-bit numerical value of "00". Hence, it is when an electronic watermark denoting "no_more_copy" is detected that the least significant bit (LSB) of the electronic watermark becomes "1". Noting this, whether the LSB of the electronic watermark is "1" may be examined to determine whether an electronic watermark denoting "no_more_copy" has been detected.

When it is found at (Step 2) that the electronic watermark denotes "no_more_copy", because copying of this content is prohibited, the electronic watermark detection means 103 sends the control signal indicative of prohibition of copying to the recording means 104 (Step 7). The recording means 104 stops compression and encryption and deletes contents which have been compressed and encrypted so far. At this stage, equipment having a display function may show a user that recording of this content is not permitted, as the electronic watermark denotes "no_more_copy".

On the contrary, when it is found at (Step 2) that the electronic watermark does not denote "no_more_copy", the electronic watermark detection means 103 waits at any desired point at or after forty-five seconds (Step 3). The electronic watermark detection means 103 then performs second electronic watermark detection which is detection of an electronic watermark as a second trial (Step 4).

After the end of the second electronic watermark detection window, the electronic watermark detection means 103 confirms whether an electronic watermark denotes "no_more_copy" (Step 5). Whether an electronic watermark denoting "no_more_copy" has been detected is determined at (Step 5) by examining whether the LSB of the electronic watermark is "1", which is similar to (Step 2).

When it is found at (Step 5) that the electronic watermark denotes "no_more_copy", because copying of this content is prohibited, the electronic watermark detection means 103 sends the control signal indicative of prohibition of copying to the recording means 104 (Step 7).

When it is found at (Step 5) that the electronic watermark does not denote "no_more_copy", it could be that this content carries an electronic watermark of "copy_freely" or "copy_one_generation" or does not carry any electronic watermark. Hence, the electronic watermark detection means 103 sends the control signal indicative of permission of copying to the recording means 104 (Step 8). The recording means 104 continues compression and encryption of the content to the end.

An SDMI-protected content is recorded in the framework of copy control utilizing electronic watermarking in the manner described above.

Playback will now be described.

Like recording, playback of SD audio is divided generally into two types: playback of SDMI-protected contents and playback of SDMI-unprotected contents. As for SDMI-protected contents and SDMI-unprotected contents, playback is similar to that described earlier in relation to the conventional techniques, and therefore, will be merely outlined below.

An SDMI-protected content is CPRM encrypted after confirming whether copyright information has been already protected by cryptography or the like at the time of recording or confirming by means of electronic watermark detection whether this is a content copying of which is permitted, and as such, is under copyright protection in accordance with the SDMI standard. Hence, for playback of an SDMI-protected content on an SD audio playback apparatus, the content may be played back without electronic watermark detection. An operation of playing back an SDMI-protected content corresponds to an operation in FIG. 10 of playing back a recorded content received as a protected input or unprotected input.

Meanwhile, as for an SDMI-unprotected content, it is not possible to confirm the origin of the SDMI-unprotected content. There is no guarantee that copyright protection in accordance with the copy control information is secured. For playback of an SDMI-unprotected content on an SD audio playback apparatus therefore, it is necessary to examine the copy control information contained in an electronic watermark embedded in the content again. Because an electronic watermark check for playback of an SDMI-unprotected content is carried out at the time of playback instead of checking electronic watermark during recording of the content, only whether the copy control information of the content to be played back denotes "no_more_copy" may be determined as in the case of SD recording, and it is not necessary to distinguish "copy_one_generation" and "copy_freely" from each other.

It is assumed that during playback, the content switching means 102 shown in FIG. 1 is controlled so as to choose a content from the playback content output terminal. An operation during playback described below corresponds to an operation in FIG. 10 of playing back an SDMI-unprotected content received as an unencrypted content input and recorded on an SD memory card and then outputting the same as an analog output.

The procedure for playback is basically similar to the procedure for sending the control signal based on the electronic watermark of the content shown in FIG. 2.

First, upon receipt of the content start command, for the purpose of detecting an electronic watermark as a first trial within fifteen seconds from the start, the electronic watermark detection means 103 starts a first electronic watermark detection window, and within thirty seconds from the start, the first electronic watermark detection completes (Step 1). The playback means 105 decrypts and expands SD audio simultaneously with the processing of electronic watermark detection, and the content output at the playback content output terminal 106 is immediately converted into an analog signal and provided to a user.

After the end of the first electronic watermark detection window, the electronic watermark detection means 103 confirms whether an electronic watermark denotes "no_more_copy" (Step 2). Whether the LSB of the electronic watermark is "1" may be examined, to determine whether an electronic watermark denoting "no_more_copy" has been detected, which is similar to the description above given in relation to the recording operation.

When it is found at (Step 2) that the electronic watermark denotes "no_more_copy", the electronic watermark detection means 103 regards this content as a copy of a copy-prohibited content and sends the control signal indicative of prohibition of copying to the playback means 105 (Step 7). The playback means 105 stops decryption and expansion, thereby stopping playback of the content. At this stage, equipment having a display function may show a user that playback is not permitted because of the electronic watermark denoting "no_more_copy".

On the contrary, when it is found at (Step 2) that the electronic watermark does not denote "no_more_copy", the electronic watermark detection means 103 waits at any desired point at or after forty-five seconds (Step 3). Playback is continued during this time. The electronic watermark detection means 103 then performs second electronic watermark detection which is detection of an electronic watermark as a second trial (Step 4).

After the end of the second electronic watermark detection window, the electronic watermark detection means 103 confirms whether the electronic watermark denotes "no_more_copy" (Step 5). Whether the LSB of the electronic watermark is "1" may be examined, to determine whether an electronic watermark denoting "no_more_copy" has been detected, which is similar to the description above given in relation to the operation during recording.

When it is found at (Step 5) that the electronic watermark denotes "no_more_copy", because copying of this content is prohibited, the electronic watermark detection means 103 sends the control signal indicative of prohibition of copying to the playback means 105 (Step 7).

When it is found at (Step 5) that the electronic watermark does not denote "no_more_copy", it could be that this content carries an electronic watermark of "copy_freely" or "copy_one_generation" or does not carry any electronic watermark. Hence, the electronic watermark detection means 103 sends the control signal indicative of permission of copying to the recording means 104 (Step 8). In accordance with this control, the playback means 105 continues playback until the end of the content.

An SDMI-unprotected content is played back in the framework of copy control utilizing electronic watermarking in the manner described above.

As described above, the recording apparatus and the playback apparatus according to the exemplary embodiment detect an electronic watermark of the pre-designated state out of a content over which an electronic watermark which can be in plural states has been superimposed, which is simpler processing as compared to where all states, namely, all types of copy control expressed by an electronic watermark are detected, thereby attaining an effect that the volume of processing is reduced.

While the foregoing has described this embodiment in relation to equipment which handles only SD audio, a product for DVD and SD may be a multi-function apparatus.

Figure 3:
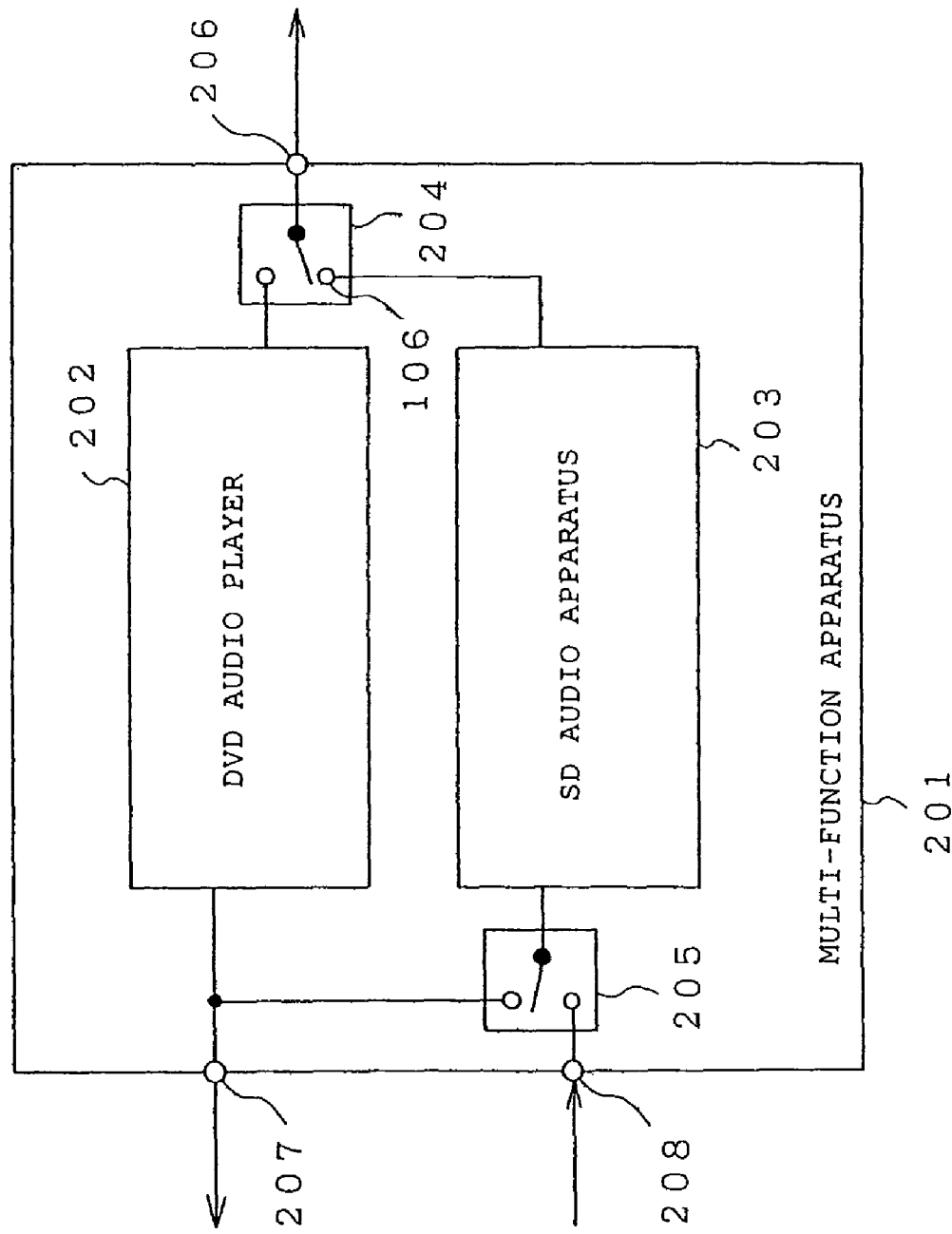
FIG. 3 is a drawing which shows the structure of a multi-function apparatus according to the exemplary embodiment of the present invention.

FIG. 3 shows the structure of such a multi-function apparatus 201. The multi-function apparatus 201 comprises a DVD audio player 202, an SD audio apparatus 203, a switch 204, a switch 205, an analog output terminal 206, a digital output terminal 207 and a digital input terminal 208.

Figure 8:
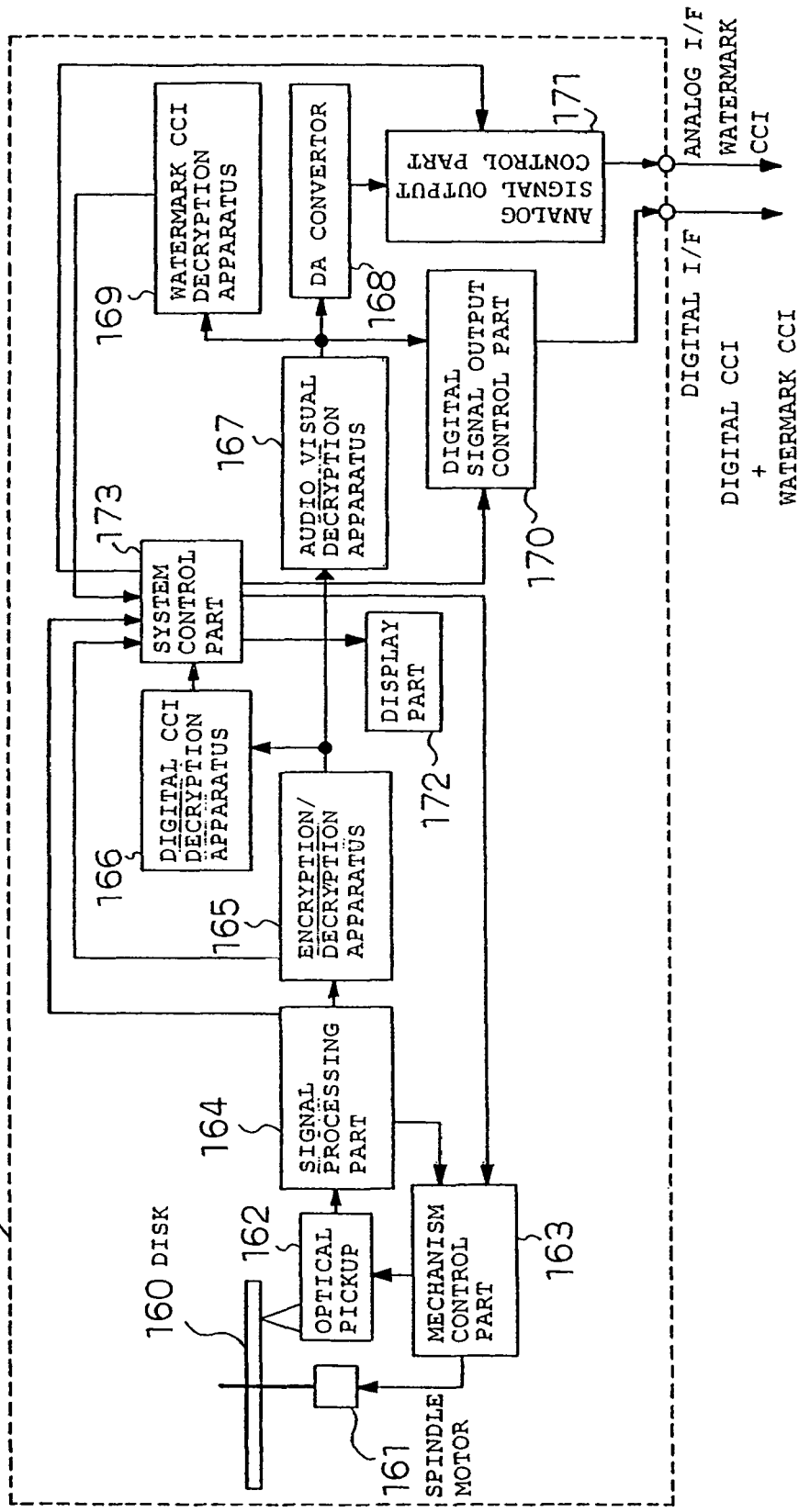
FIG. 8 is a block diagram of an optical disk player which uses a conventional copy control method.
Figure 9:
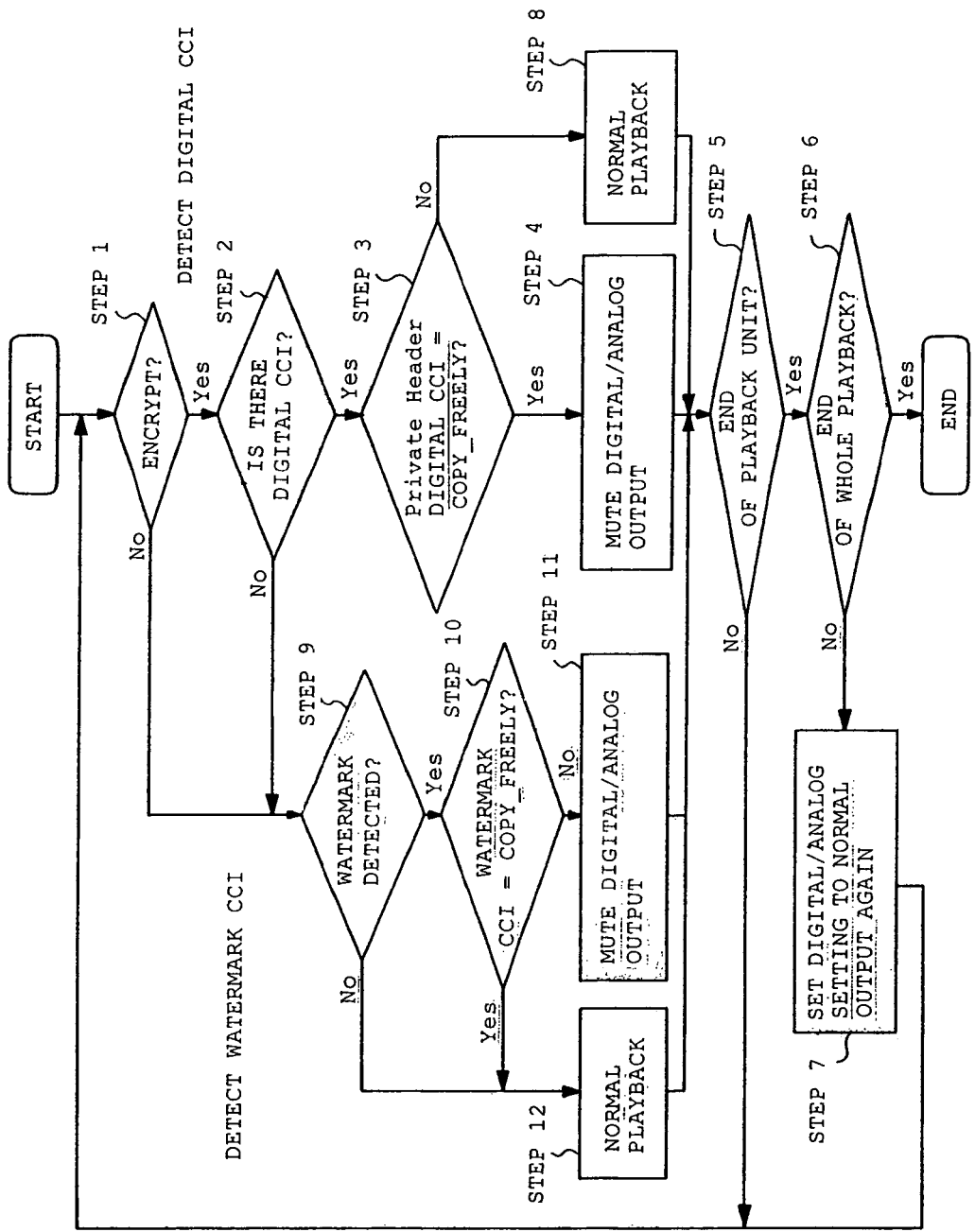
FIG. 9 is a flow chart of copy control during playback on an optical disk player which uses the conventional copy control method.

The DVD audio player 202 is the optical disk player 174 shown in FIG. 8 referred to in relation to the first conventional technique. The SD audio apparatus 203 is the recording/playback apparatus shown in FIG. 1 according to the embodiment.

The multi-function apparatus 201 performs the operation described in relation to the first conventional technique in the event that the DVD audio player 202 is to play back DVD audio. When the DVD audio player 202 is to play back DVD audio, the switch 204 changes over so as to connect the DVD audio player 202 with the analog output terminal 206. Hence, as the DVD audio player 202 plays back DVD audio, an analog signal corresponding to DVD audio thus played back is output at the analog output terminal 206. Further, a digital signal corresponding to DVD audio thus played back is output at the digital output terminal 207.

Meanwhile, when the SD audio apparatus 203 is to record DVD audio thus played back on the DVD audio player 202 onto an SD card memory, the switch 205 changes over so as to connect the DVD audio player 202 with the SD audio apparatus 203. When a user wishes to listen to DVD audio thus played back, the switch 204 changes over so as to connect the DVD audio player 202 with the analog output terminal 206, and the analog signal corresponding to DVD audio thus played back is output at the analog output terminal 206. An instance that the SD audio apparatus 203 records DVD audio thus played back on the DVD audio player 202 onto an SD memory card will be described later. When the SD audio apparatus 203 is to record a content input at the digital input terminal 208 onto an SD memory card, the SD audio apparatus 203 operates in a similar manner to that of the recording/playback apparatus according to the exemplary embodiment.

When the SD audio apparatus 203 is to play back a content recorded on an SD memory card, the switch 204 changes over so as to connect the SD audio apparatus 203 with the analog output terminal 206, and the content played back on the SD audio apparatus 203 is output at the analog output terminal 206 as an analog signal. At this stage, the SD audio apparatus 203 operates in a similar manner to that of the recording/playback apparatus according to the exemplary embodiment.

The DVD audio player 202 of the multi-function apparatus 201 according to the embodiment is an example of the playback means of the multi-function apparatus according to the present invention, the SD audio apparatus 203 of the multi-function apparatus 201 according to the embodiment is an example of the recording means of the multi-function apparatus according to the present invention, and the DVD audio player 202 and the SD audio apparatus 203 of the multi-function apparatus 201 according to the embodiment are an example of the electronic watermark detection means of the multi-function apparatus according to the present invention.

When the DVD audio player 202 is to play back a DVD, the multi-function apparatus 201 requires electronic watermark detection of all states, namely, all types of copy control expressed by the copy control information as in the case of the first conventional technique. Meanwhile, when the SD audio apparatus 203 is to record a content input at the digital input terminal 208, as described in relation to the exemplary embodiment above, "no_more_copy" alone of the copy control information may be detected. Hence, in the case of such a multi-function apparatus 201, it is convenient if it is possible to switch in accordance with a medium between detection of only an electronic watermark of the pre-designated state, namely, only an electronic watermark of the pre-designated type of copy control and detection of electronic watermarks of all states, namely, electronic watermarks of all types of copy control.

Figure 10:
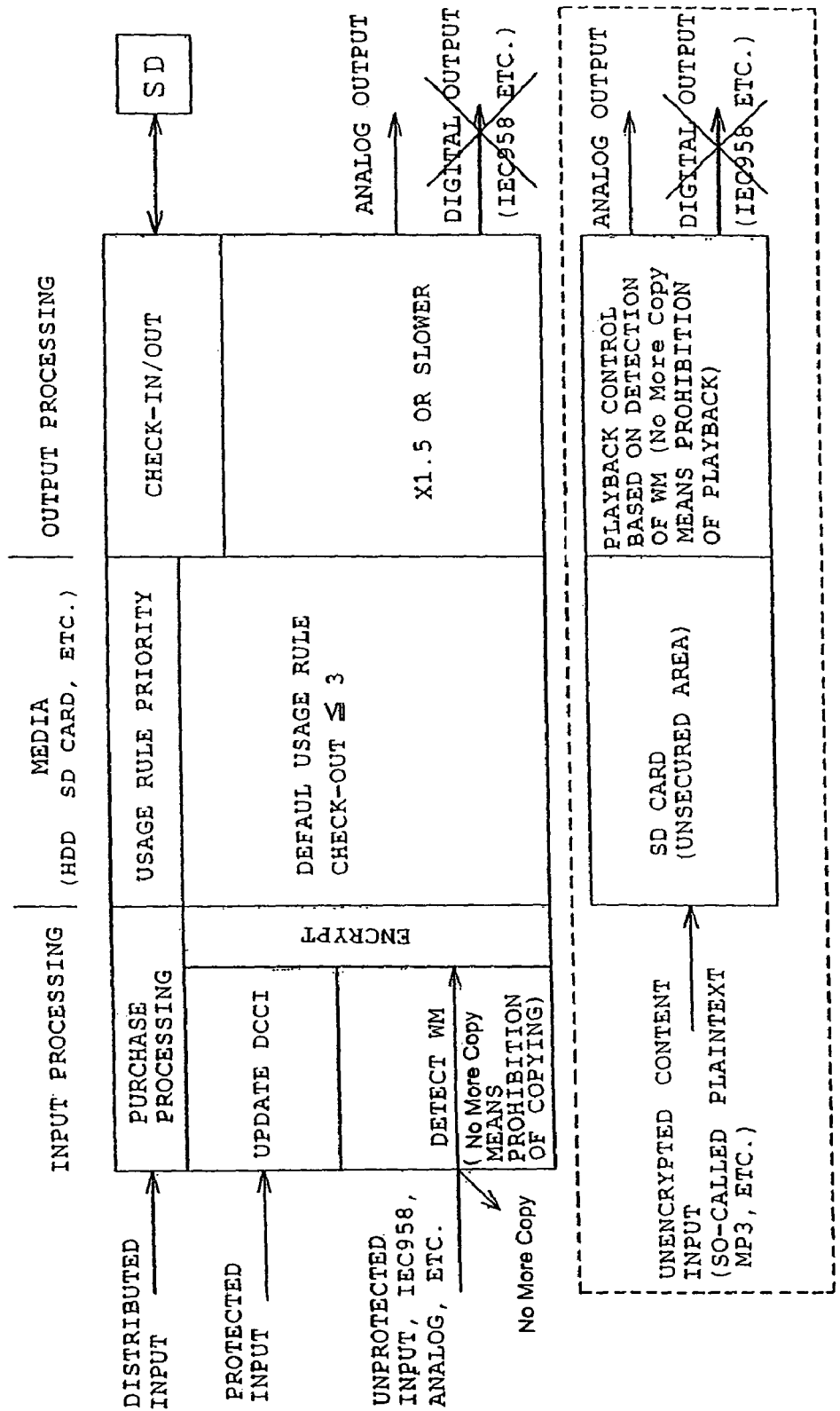
FIG. 10 is a drawing which shows the outline of the SDMI control method.

When the SD audio apparatus 203 is to record, via an internal connection, DVD audio contents played back on the DVD audio player 202, processing related to the distributed input shown in FIG. 10 is performed. In other words, DVD audio contents are protected by CPRM encryption, and therefore, it is not possible to tamper digital CCI contained in DVD audio. Hence, the digital CCI of these determine whether to permit recording, a recording condition, etc. In this case, it is not necessary to perform electronic watermark detection.

Digital CCI of DVD audio defines (1) whether to permit copying of audio, (2) the number of audio copies, (3) the tone quality of audio, (4) whether to permit copying of a relevant content, (5) CCI for conventional equipment, and the like. The element (1) whether to permit copying of audio is used in combination with the element (2) the number of audio copies, and expresses "free copying is permitted", "copying is permitted up to the number of audio copies", "copying is permitted in a predetermined compression format up to the number of audio copies", etc. Each content bears a unique identification code which is for commercial contents and called ISRC (International Standard Recording Code), and the equipment must associate ISRC with the number of copies and count the number of copies made of the content. The element (3) the tone quality of audio sets the number of channels of a copy (e.g., multiple of channels such as 5.1 channel, 2 channel), a sampling frequency, a bit length, a bit rate in the case of compressed audio, etc. The element (4) whether to permit copying of a relevant content denotes whether it is permitted to copy a still picture related to an audio content. The element (5) CCI for conventional equipment expresses a rule for digital copying onto an MD, a CD-R, a DAT via an internal connection.

When the SD audio apparatus 203 is to record, via an internal connection, DVD audio contents played back on the DVD audio player 202, the contents are recorded as SDMI-protected contents in accordance with (1) whether to permit copying of audio, (2) the number of audio copies, (3) the tone quality of audio of digital CCI and the like.

Further, where the multi-function apparatus is equipped with a DVD function which is in compliance with the SDMI control method and a playback function which is in compliance with CD-DA (Compact Disk Digital Audio) and in the event that the multi-function apparatus has a function of recording on one or more of a CD-R, an MD, an HDD (hard disk) and the like, a CD-DA, a CD-R, an MD and an HDD are supposed to be processed by the CPPM control method. Also when a content recorded on a CD-DA of such a multi-function apparatus is to be played back and then recorded via an internal connection of the multi-function apparatus onto a CD-R or MD inside the multi-function apparatus or an HDD built within the multi-function apparatus, with the medium of the recording/playback apparatus according to the embodiment changed from an SD memory card to the CD-R or MD or the HDD built within the multi-function apparatus, the recording/playback apparatus according to the embodiment becomes applicable and it becomes possible to attain an equivalent effect to that promised by the exemplary embodiment. However, when content is to be recorded on a CD-R, an MD or a built-in HDD, CPRM encryption/recording is not performed. Further, for playback from these media, playback control utilizing electronic watermarking is not performed either.

In short, when audio contents recorded on a CD-DA are to be played back in such a multi-function apparatus complying with the CPPM control method and then recorded via an internal connection onto a CD-R or MD of the multi-function apparatus or an HDD built within the multi-function apparatus, electronic watermarks of audio contents to be recorded are detected. Whether to record the audio contents is determined in accordance with whether electronic watermarks are detected and the copy control information contained in the detected electronic watermarks.

Figure 4:
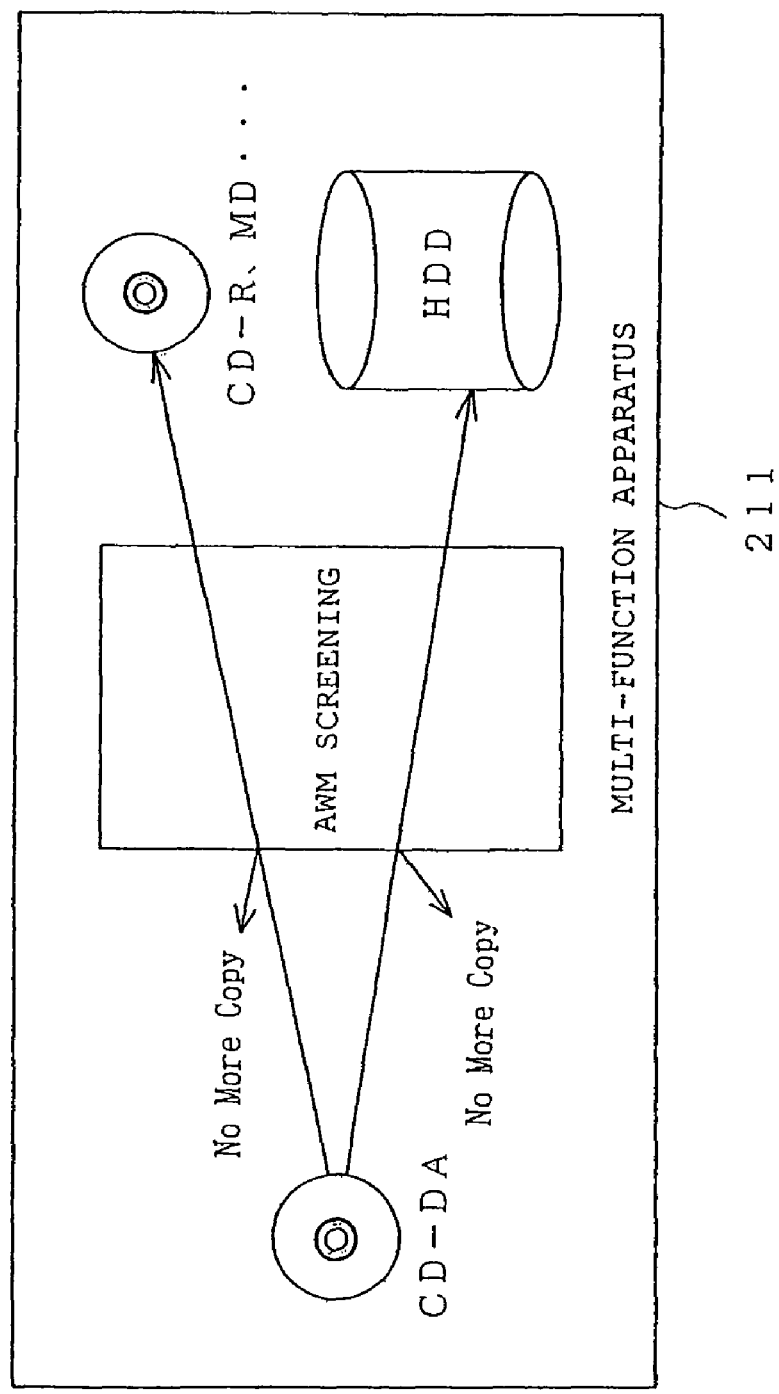
FIG. 4 is a drawing which shows the outline of processing performed by the multi-function apparatus according to the exemplary embodiment of the present invention.

Hence, when audio contents recorded on a CD-DA are to be input and then recorded via an internal connection of the multi-function apparatus onto a CD-R or MD of the multi-function apparatus or an HDD built within the multi-function apparatus, a similar operation to the recording operation according to the embodiment may be carried out. FIG. 4 is a drawing which shows the outline of processing performed by a multi-function apparatus 211, which executes a similar operation to the recording operation of the recording/playback apparatus according to the embodiment, for recording of audio contents recorded on a CD-DA via an internal connection of the multi-function apparatus onto a CD-R or MD of the multi-function apparatus or an HDD built within the multi-function apparatus.

In other words, in this case, the multi-function apparatus 211 first plays back an audio content recorded on the CD-DA. The multi-function apparatus 211 then detects an electronic watermark of thus played back audio content and performs screening based on the electronic watermark embedded in the audio content, as expressed in FIG. 4 as AWM (audio watermark) SCREENING. That is, as expressed in FIG. 4 as "no_more_copy", recording onto a CD-R or MD of the multi-function apparatus 211 or an HDD built within the multi-function apparatus 211 does not take place when the electronic watermark denotes "no_more_copy", whereas when the electronic watermark does not denote "no_more_copy" or no electronic watermark has been detected, the audio contents thus played back are recorded onto these media.

When the audio contents thus played back are to be recorded onto a CD-R or MD of the multi-function apparatus 211 or an HDD built within the multi-function apparatus 211, SCMS information stored in the CD-DA is reflected in the recording medium. In short, SCMS is recorded as is onto the recording medium when SCMS denotes "copy_freely", while SCMS is updated to "no_more_copy" and then recorded onto the recording medium when SCMS denotes "copy_one_generation". It is not necessary to reflect the copy control information embedded in the electronic watermarks onto these media. Hence, when the multi-function apparatus 211 is to detect the electronic watermarks of the audio contents recorded on the CD-DA, as in the recording/playback apparatus according to the embodiment, "no_more_copy" alone may be detected and it is not necessary to distinguish "copy_freely" and "copy_one_generation" from each other. Therefore, with the medium of the recording/playback apparatus according to the embodiment changed from an SD memory card to the CD-R or MD or the HDD built within the multi-function apparatus, the recording/playback apparatus according to the embodiment may be applied to such a multi-function apparatus 211.

Figure 5:
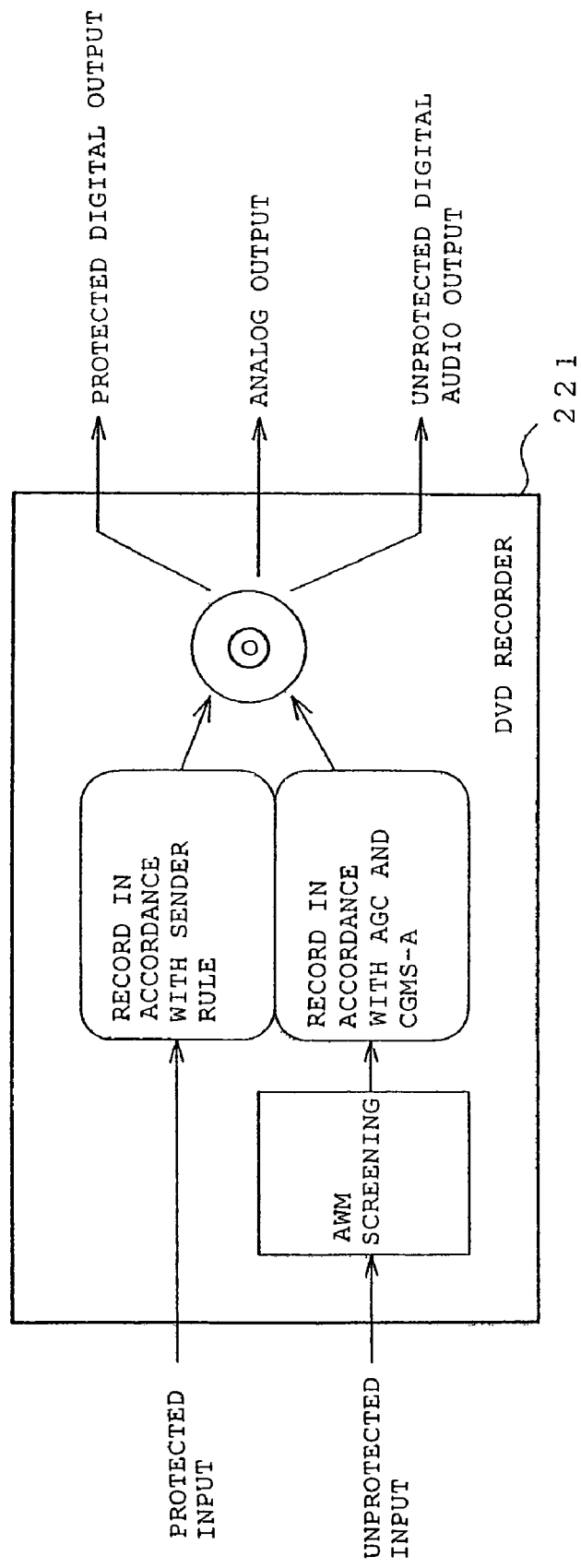
FIG. 5 is a drawing which shows the outline of processing performed by a DVD recorder according to the exemplary embodiment of the present invention.

Further, the recording/playback apparatus according to the embodiment is applicable also to a DVD recorder complying with the CPRM control method. FIG. 5 shows the outline of processing performed by such a DVD recorder 221. The DVD recorder 221 is for a DVD-R, a DVD-RW, a DVD-RAM, etc., and contents handled are audio visual contents such as video formed by moving pictures and speech.

As for inputs to the DVD recorder 221, protected inputs and unprotected inputs are accepted. A protected input is inputting of a content transmitted by IEEE1394-DTCP, inputting of a content protected by the B-CAS method from a digital broadcasting tuner built within the DVD recorder 221, etc. A content received as a protected input is recorded in accordance with a rule set for the sender, as expressed in FIG. 5 as RECORD IN ACCORDANCE WITH SENDER RULE. An unprotected input is inputting of content as an analog signal.

As for outputs from the DVD recorder 221, there are protected digital outputs, analog outputs and unprotected digital audio outputs. A protected digital output is outputting in accordance with EEE1394-DTCP, HDCP (High-bandwidth Digital Content Protection), etc. HDCP referred to here is a content protection technique such as HDMI (High-Definition Multimedia Interface) which is for connection between source equipment and a display apparatus. An analog output is outputting of content as an analog signal: Based on digital CCI of a content which is played back, AGC (Automatic Gain Control) and CGMS-A (Copy Generation Management System) are added and the content is output. AGC herein referred to is a copy protection technique for analog video signals proposed by Macrovision. CGMS-A refers to a copy control mechanism for audio visual contents such as video, and the letter "A" denotes analog. That is, CGMS-A demands addition during a vertical interval of an analog signal expressing video. An unprotected digital audio output is in line with IEC60958, IEC61937, etc. IEC60958 and IEC61937 are digital audio interfaces and specify optical cable interface specifications for CDs, MDs, etc. IEC60958 requires use of linear PCM, while IEC61937 requires use of compressed audio such as AC3.

Where the DVD recorder 221 shown in FIG. 5 is to record contents received as unprotected inputs onto media such as a DVD-R, a DVD-RW and a DVD-RAM, when an SD memory card of the recording/playback apparatus according to the embodiment is replaced with media such as a DVD-R, and a DVD-RW and a DVD-RAM and when the operation of encryption/recording is slightly modified. The recording/playback apparatus according to the exemplary embodiment becomes applicable.

That is, for recording of contents received as unprotected inputs, namely, contents which are audio visual contents received as analog signals onto media such as a DVD-R, a DVD-RW and a DVD-RAM within the DVD recorder 221, the DVD recorder 221 first detects electronic watermarks of the contents received as analog signals, and as expressed in FIG. 5 as AWM (audio watermark) SCREENING, performs screening based on the electronic watermarks. In other words, when an electronic watermark is detected and the detected electronic watermark denotes "no_more_copy", the DVD recorder 221 does not record the content received as the analog signal. When no electronic watermark is detected or an electronic watermark is detected but the detected electronic watermark denotes other than "no_more_copy", recording on a DVD-R, a DVD-RW and a DVD-RAM or the like is performed in accordance with AGC and CGMS-A of the contents received as the analog signals as expressed in FIG. 5 as RECORD IN ACCORDANCE WITH AGC AND CGMS-A. In the event that CGMS-A denotes "copy_one_generation" for instance, CGMS-A is updated to "no_more_copy" and the contents received as the analog signals are encrypted and recorded based on the CPRM control method. Meanwhile, when CGMS-A denotes "copy_freely", the contents received as the analog signals are recorded without being encrypted. Also, when no electronic watermark has been detected recording does not accompany encryption either.

When an electronic watermark is detected and whether the electronic watermark denotes "no_more_copy" in the DVD recorder 221, a similar operation to the operation of the recording/playback apparatus according to the exemplary embodiment is executed, thereby attaining an equivalent effect to that realized by the recording/playback apparatus according to the exemplary embodiment. While the recording/playback apparatus according to the exemplary embodiment encrypts and records all contents for recording of the contents, the DVD recorder 221 is different in that the DVD recorder 221 encrypts and records contents depending upon whether electronic watermarks are detected and in accordance with AGC and CGMS-A.

Meanwhile, contents such as audio visual contents received as protected inputs are recorded in accordance with a sender rule.

In this fashion, for recording of contents received as unprotected inputs, the DVD recorder 221 can perform an approximately equivalent operation to that of the recording/playback apparatus according to the exemplary embodiment.

Although the exemplary embodiment is directed to an example of whether an electronic watermark denoting "no_more_copy" has been detected, which in turn is determined by noting whether the LSB of the electronic watermark is "1", the present invention is not limited to this approach. For instance, the present invention may be implemented omitting the aspect that the electronic watermark detection flag or the MSB of an electronic watermark is processed. The processing according to the present invention, may of course, remains applicable even to such an instance.

FIG. 6 shows how an electronic watermark in each state is detected while changing between a mode of detecting only such an electronic watermark which is in the pre-designated state ("no_more_copy") and a mode of detecting electronic watermarks in all states.

Figure 11:
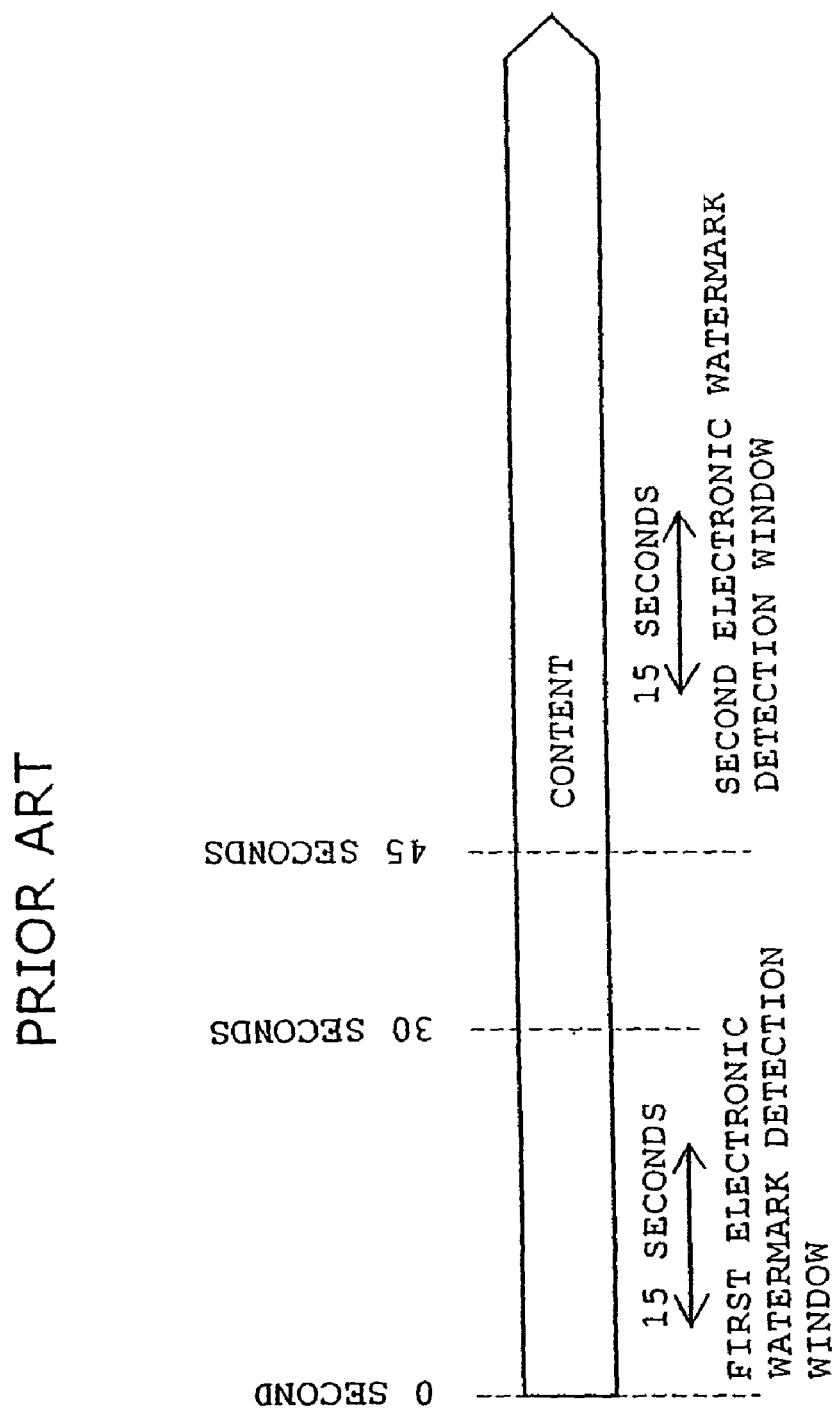
FIG. 11 is a drawing which shows the timing of detecting an electronic watermark according to the second conventional technique.
Figure 12:
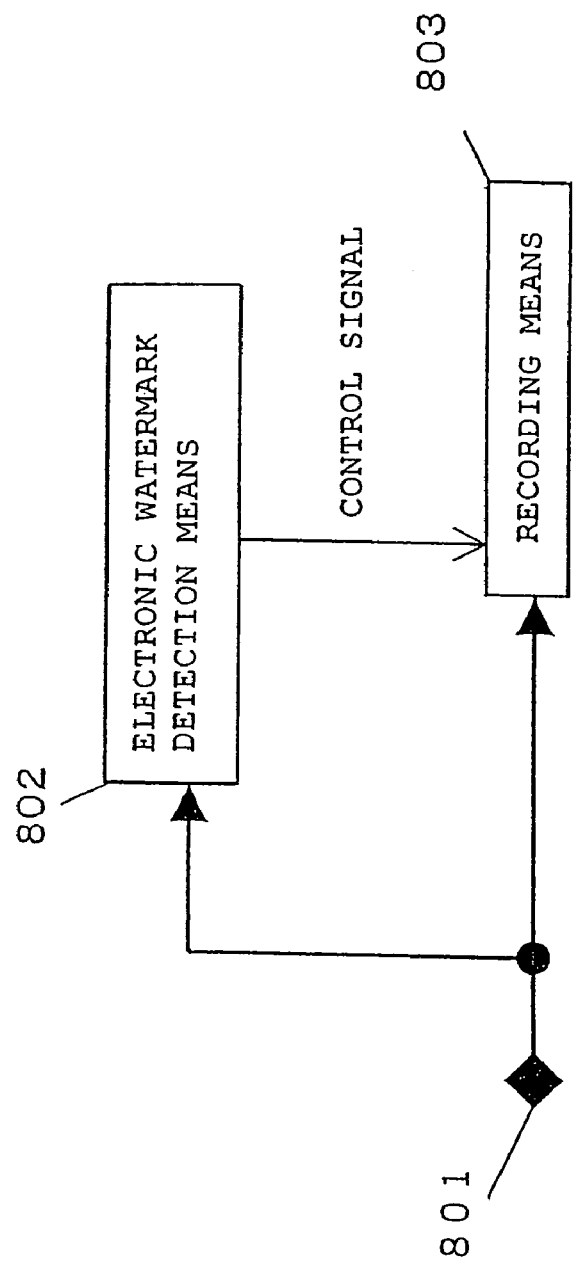
FIG. 12 is a block diagram of a recording apparatus which utilizes electronic watermarking according to the second conventional technique.
Figure 13:
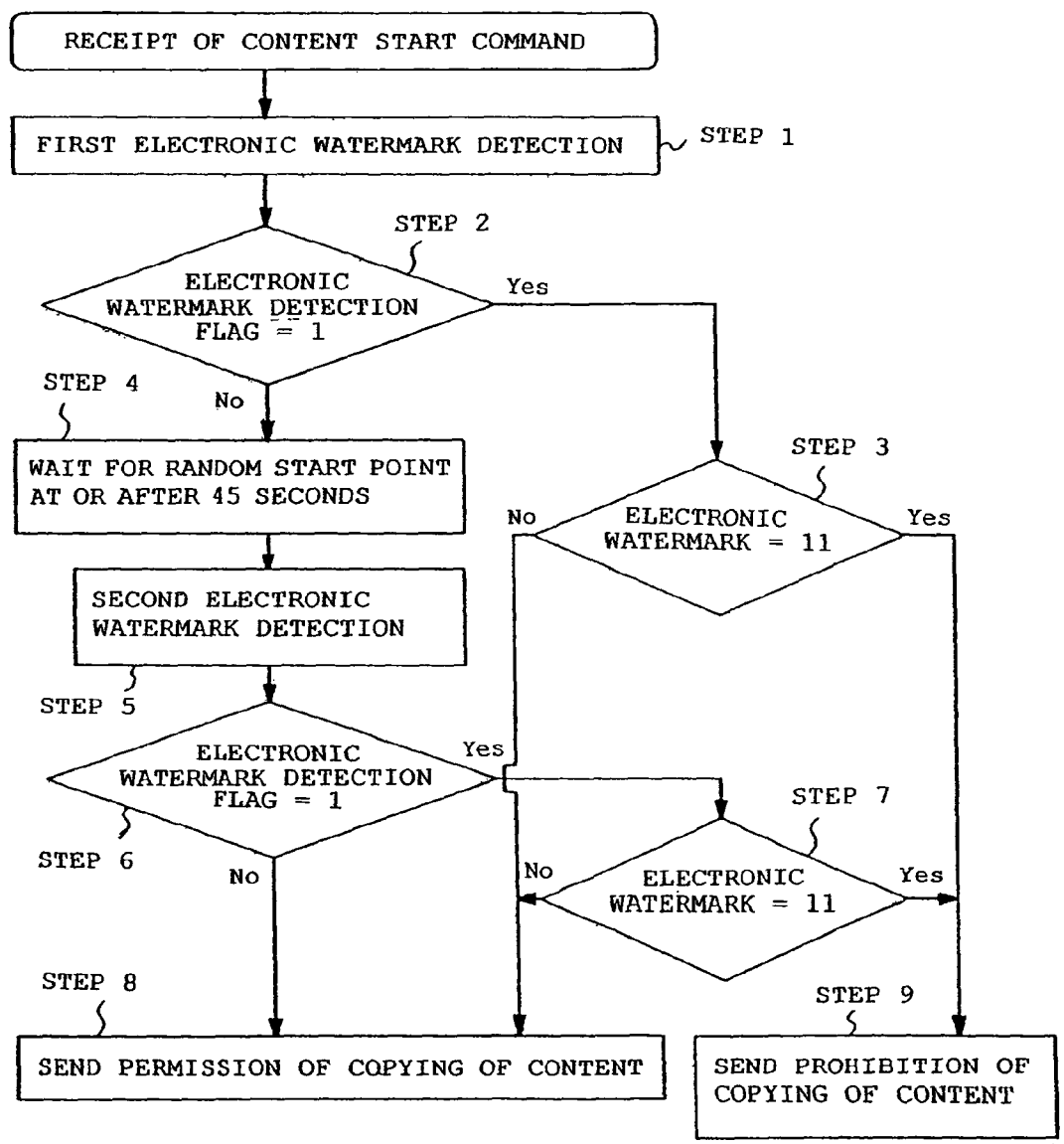
FIG. 13 is a flow chart which shows the procedure of sending a control signal based on an electronic watermark of content according to the second conventional technique.

The mode described as "NO_MORE_COPY" ONLY in the "DETECTION MODE" in FIG. 6 is a mode of detecting whether an embedded electronic watermark denotes or does not denote "no_more_copy" among four instances, i.e., an instance that there is no embedded electronic watermark, an instance that an embedded electronic watermark denotes "copy_freely", an instance that an embedded electronic watermark denotes "copy_one_generation" and an instance that an embedded electronic watermark denotes "no_more_copy". On the other hand, the mode described as ALL in the "DETECTION MODE" is a mode of detecting all of the four instances, i.e., an instance that there is no embedded electronic watermark, an instance that an embedded electronic watermark denotes "copy_freely", an instance that an embedded electronic watermark denotes "copy_one_generation" and an instance that an embedded electronic watermark denotes "no_more_copy". Further, FIRST DETECTION RESULT denotes a result that an embedded electronic watermark is detected through FIRST ELECTRONIC WATERMARK DETECTION in FIGS. 11 and 2, and SECOND DETECTION RESULT denotes a result that an embedded electronic watermark is detected through SECOND ELECTRONIC WATERMARK DETECTION in FIGS. 11 and 2.

In either mode, a conclusion as for whether to eventually permit copying, is NO only when there is an embedded electronic watermark denoting "no_more_copy", which does not change depending upon the mode. However, when there are embedded electronic watermarks denoting "copy_freely" and "copy_one_generation", NO DETECTION is the result of both of the two detections in the mode of detecting "no_more_copy" alone. Whereas in the mode of detecting ALL, the embedded electronic watermarks are detected in the first detection and whether to permit copying is finally determined. For content such as a CD, which is generally unlikely to contain embedded electronic watermarks, implementing the control to invoke the mode of detecting "no_more_copy" alone is efficient. Meanwhile, when DVD audio is to be recorded analog, etc., it is likely that the contents carry embedded electronic watermarks. In such an instance, the control to invoke the mode of detecting all may be exercised. Embedded electronic watermarks may be detected, only once, in the event that the copy control information of the contents denote "copy_one_generation" or "copy_freely", thereby reducing the volume of processing for detection of the electronic watermarks.

When SD recording of DVD audio at a high speed is desired, the control to invoke the mode of detecting "no_more_copy" alone may be implemented, thereby reducing the load imposed by detection of electronic watermarks and increasing the processing speed. Whereas for SD playback of SDMI-unprotected contents, which does not demand high-speed processing unlike in the case of high-speed recording, the control to invoke the mode of detecting all electronic watermarks may be implemented, thereby reducing the number of times to detect electronic watermarks.

Further, although the foregoing has described that the copy control information denotes three types of control of "no_more_copy", "copy_one_generation" and "copy_freely" according to the exemplary embodiment, this is not limiting. The copy control information may express four, five or other plural types of control. For instance, the copy control information may express four types of control of "no_more_copy", "copy_one_generation", "copy_freely" and "copy_no_more". In this context, "no_more_copy", "copy_one_generation" and "copy_freely" have similar meanings to those described above. Meanwhile, "copy_no_more" is a style of copy control for a situation that a content marked "copy_one_generation" is copied once. This copy is thereafter played back, meaning that further copying is prohibited. For SD audio recording of an SDMI-unprotected content containing such copy control information, electronic watermarks denoting the two types of copy control, i.e., "no_more_copy" and "copy_no_more" may be detected. In general, even when there are n types of copy styles (where n is an integer equal to or larger than 1) expressed by copy control information, for recording of such an SDMI-unprotected content, a certain portion of the copy control information maybe detected from among the n types of copy styles, thereby achieving a similar effect to that according to the embodiment. Playback of SDMI-unprotected contents is similar to recording of them.

Although the foregoing has described the exemplary embodiment in relation to recording or playback of SDMI-protected contents recorded using an SD apparatus complying with the SDMI control method and SDMI-unprotected contents which are contents other than SDMI-protected contents, recording or playback of contents complying with a control method other than the SDMI control method and contents other than contents which are in compliance with the other control method is also similar.

According to the present invention, the recording apparatus and the playback apparatus of the present invention includes the electronic watermark detection means, which detect an electronic watermark of the pre-designated state alone out of a content over which an electronic watermark which can be in plural states has been superimposed, the recording means which record or the playback means which play back said content in accordance with the result of the detection performed by said electronic watermark detection means, and detects an electronic watermark of the pre-designated state out of a content over which an electronic watermark, which can be in the plural states, has been superimposed. Therefore the processing is simpler as compared to where electronic watermarks of all states are detected, thus attaining an effect that the volume of processing is reduced.

A program according to the present invention is a program which operates in co-operation with a computer and which makes the computer execute the functions of all or some means (or apparatuses, elements, etc.) of the recording apparatus of the present invention described above.

Further, a program according to the present invention is a program which operates in co-operation with a computer and which makes the computer execute the functions of all or some means (or apparatuses, elements, etc.) of the playback apparatus of the present invention described above.

Further, a recording medium according to the present invention is a recording medium which can be read on a computer and which holds such a program which makes a computer execute the functions of all or some means (or apparatuses, elements, etc.) of the recording apparatus of the present invention described above and which operates in co-operation with a computer when read to thereby execute said functions.

Further, a recording medium according to the present invention is a recording medium which can be read on a computer and which holds such a program which makes a computer execute the functions of all or some means (or apparatuses, elements, etc.) of the playback apparatus of the present invention described above and which operates in co-operation with a computer when read to thereby execute said functions.

In relation to a program or a recording medium according to the present invention, "some means (or apparatuses, elements, etc.)" described above refer to one or some means among these plurality of means and "some steps (or processes, operations, functions, etc.)" described above refer to one or some steps among these plurality of steps.

In relation to a program or a recording medium according to the present invention, the "functions of means (or apparatuses, elements, etc.)" described above refer to all or some functions of said means, while the "operations at steps (or processes, operations, functions, etc.)" described above refer to all or some operations at said steps.

In one example of use, a program according to the present invention may be recorded on a recording medium which can be read on a computer so that the program operates in co-operation with the computer.

In one example of use, a program according to the present invention may be transmitted through a transmission medium and read by a computer so that the program operates in co-operation with the computer.

The recording medium includes a ROM, etc., whereas the transmission medium includes a transmission medium such as the Internet, light, an electric wave, a sound wave, etc.

The computer mentioned above in relation to the present invention is not limited to pure hardware such as a CPU but may include firmware, OS and even peripheral equipment.

As described above, the structure according to the present invention may be realized by software or hardware.

As described clearly above, the present invention provides a recording apparatus, a playback apparatus, a multi-function apparatus, a recording method, a playback method, a recording/playback method, a program and a recording medium which realize efficient detection of an electronic watermark.

The invention claimed is:

1. A recording apparatus which executes copy control utilizing copy control information which is formed by plural bits of digital data and indicative of plural types of copy control, comprising:

an electronic watermark detection section which detects only a predetermined certain bit of digital data in said copy control information indicative of one type of copy control, without recognizing all of the types of copy control, out of a content over which an electronic watermark expressing said copy control information is superimposed; and a recording section which records said content based on a detection result obtained by said electronic watermark detection section, wherein:

said copy control information includes: i) information indicative of "no_more_copy," ii) information indicative of an allowable copy corresponding to a first condition, and iii) information indicative of an allowable copy corresponding to a second condition, said copy control information enables determination that said content is "no_more_copy" from said information indicative of "no_more_copy" or said information indicative of said first condition or second condition, by using only said predetermined certain bit of digital data, and said recording section (i) does not record said content when said detection result indicates that said content is said "no_more_copy" and (ii) records said content without determining that said copy control information is said information indicative of said first condition or is said information indicative of said second condition, by further analyzing said copy control information when said detection result indicates that said content is said allowable copy.

2. The recording apparatus of claim 1 which is an SD apparatus complying with the SDMI control method, wherein said allowable copy corresponding to said first condition represents "copy_freely", and said allowable copy corresponding to said second condition represents "copy_one_generation", and said predetermined certain bit of digital data expressing said "no_more_copy".

3. The recording apparatus of claim 1 which is a recording apparatus complying with the CPPM control method or the CPRM control method, wherein said allowable copy corresponding to said first condition represents "copy_freely" and said allowable copy corresponding to said second condition represents "copy_one_generation", and said predetermined certain bit of digital data expressing said "no_more_copy".

4. The recording apparatus of claim 2, wherein said recording section encrypts and records said content.

5. The recording apparatus of claim 1, wherein said content is an audio content.

6. A multi-function apparatus which executes copy control utilizing copy control information which is indicative of plural types of copy control, comprising:

an electronic watermark detection section which detects copy control information out of a content over which an electronic watermark expressing said copy control information is superimposed;

a recording section which records said content in accordance with a detection result obtained by said electronic watermark detection section; and a playback section which plays back said content in accordance with the detection result obtained by said electronic watermark detection section, wherein for recording of said content, said electronic watermark detection section detects only a predetermined copy control information portion of said copy control information out of said content over which the electronic watermark expressing said copy control information is superimposed, and for playback of said content, said electronic watermark detection section detects all of said copy control information out of said content over which the electronic watermark expressing said copy control information is superimposed.

7. A recording medium which can be processed on a computer and which holds a program of the multi-function apparatus of claim 6, said recording medium makes a computer function as:

a part of an electronic watermark detection section which detects copy control information out of a content over which an electronic watermark expressing said copy control information is superimposed;

a part of a recording section which records said content in accordance with a detection result obtained by said electronic watermark detection section; and a part of a playback section which plays back said content in accordance with the detection result obtained by said electronic watermark detection section.

8. A recording method of executing copy control utilizing copy control information which is formed by plural bits of digital data and indicative of plural types of copy control, comprising:

an electronic watermark detection step which detects only a predetermined certain bit of digital data in said copy control information indicative of one type of copy control, without recognizing all of the types of copy control, out of a content over which an electronic watermark expressing said copy control information is superimposed; and a recording step which records said content based on a detection result obtained by said electronic watermark detection step, wherein:

said copy control information includes: i) information indicative of "no_more_copy," ii) information indicative of an allowable copy corresponding to a first condition, and iii) information indicative of an allowable copy corresponding to a second condition, said copy control information enables determination that said content is "no_more_copy" from said information indicative of "no_more_copy" or said information indicative of said first condition or second condition, by using only said predetermined certain bit of digital data, and said recording step (i) does not record said content when said detection result indicates that said content is said "no_more_copy" and (ii) records said content without determining that said copy control information is said information indicative of said first condition or is said information indicative of said second condition, by further analyzing said copy control information when said detection result indicates that said content is said allowable copy.

9. A recording/playback method for use in a multi-function apparatus which executes copy control utilizing copy control information which is indicative of plural types of copy control, comprising:

an electronic watermark detecting step detecting copy control information out of a content over which an electronic watermark expressing said copy control information is superimposed;

a recording step recording said content in accordance with a detection result obtained by said electronic watermark detecting step; and a playing back step playing back said content in accordance with the detection result obtained by said electronic watermark detecting step, wherein when recording of said content is desired, at said electronic watermark detecting step, only a predetermined copy control information portion of said copy control information is detected out of said content over which the electronic watermark expressing said copy control information is superimposed, and when playing back of said content is desired, at said electronic watermark detecting step, all of said copy control information is detected out of said content over which the electronic watermark expressing said copy control information is superimposed.

10. A recording medium which can be processed on a computer and which holds a program of the recording apparatus of claim 1, said recording medium makes a computer function as:

a part of an electronic watermark detection section which detects only a predetermined certain bit of digital data in said copy control information indicative of one type of copy control, without recognizing all of the types of copy control, out of a content over which an electronic watermark expressing said copy control information is superimposed; and a part of a recording section which records said content based on a detection result obtained by said electronic watermark detection section, wherein:

said copy control information includes: i) information indicative of "no_more_copy," ii) information indicative of an allowable copy corresponding to a first condition, and iii) information indicative of an allowable copy corresponding to a second condition, said copy control information enables determination that said content is "no_more_copy" from said information indicative of "no_more_copy" or said information indicative of said first condition or second condition, by using only said predetermined certain bit of digital data, and said recording section (i) does not record said content when said detection result indicates that said content is said "no_more_copy" and (ii) records said content without determining that said copy control information is said information indicative of said first condition or is said information indicative of said second condition, by further analyzing said copy control information when said detection result indicates that said content is said allowable copy.

* * * * *